United States Patent [19]

Frisch et al.

[11] Patent Number: 4,742,128

[45] Date of Patent: May 3, 1988

[54] PROCESS FOR PREPARING A POLYMER ALLOY, MOLDED PRODUCT, AND REACTION INJECTION MOLDED PRODUCTS

[75] Inventors: Kurt C. Frisch, Grosse Ile; Kaneyoshi Ashida, Farmington Hills, both of Mich.; Jozef L. M. van der Loos, Sittard; Albert A. van Geenen, Brunssum, both of Netherlands

[73] Assignee: Stamicarbon B.V., Geleen, Netherlands

[21] Appl. No.: 787,139

[22] Filed: Oct. 15, 1985

[51] Int. Cl.$^4$ ............................................. C08L 75/00
[52] U.S. Cl. .................... 525/424; 264/240; 264/331.19; 525/453; 525/454; 525/903
[58] Field of Search ............... 525/424, 454, 458, 903, 525/453; 264/240, 331.19

[56] References Cited

U.S. PATENT DOCUMENTS

| | | | |
|---|---|---|---|
| 4,302,553 | 11/1981 | Frisch et al. | 525/28 |
| 4,396,729 | 8/1983 | Dominquez et al. | 521/51 |
| 4,613,440 | 9/1986 | Zupancic et al. | 210/490 |
| 4,695,483 | 9/1987 | Zupancic et al. | 427/244 |
| 4,695,509 | 9/1987 | Cordova et al. | 428/267 |

FOREIGN PATENT DOCUMENTS 1099265  1/1968  United Kingdom .

OTHER PUBLICATIONS

Lloyd et al., "Polyurethane RIM: A Competitive Plastic Molding Process", ACS Symposium Series 270, pp. 15–24 (1985).

Johnson et al., Shell Polymers, vol. 7, No. 3, 1983, pp. 75–79, "Reaction Injection Moulding Reviewed.

Sperling, "Recent Advances in Interpenetrating Polymer Networks" Polymer Engineering and Science, vol. 25, No. 9, pp. 517–520 (Jun. 1985).

Sperling, Interpenetrating Polymer Networks and Related Materials, pp. 202–204, 243–261, (Plenum Press, 1981).

Walsh et al., editors, Polymer Blends and Mixtures, pp. 267–287 (1985), 27 Polymer Preprints No. 1, pp. 495–496 (Apr. 1986).

*Primary Examiner*—Theodore E. Pertilla
*Attorney, Agent, or Firm*—Cushman, Darby & Cushman

[57] ABSTRACT

The present invention provides a molded product composed of a polymer alloy of a polyamide polymer and at least one polyurethane polymer, polyurea polymer, and/or polyisocyanurate polymer. The polymer alloy is an interpenetrated network of different polymers, a semi-interpenetrating network of different polymers, or a polyblend of different polymers.

Reactant streams containing the compounds for forming the polymers of the polymer alloy are admixed to form a reaction mixture. The liquid reaction mixture is preferably a substantially homogeneous mixture of the reactant compounds. Each reactant stream thus contains only a portion of the components required to obtain the polymer alloy product. The resulting mixture is then rapidly introduced into a mold wherein chemical reaction takes place and the polymer alloy forms. Preferably, the mold is heated. The solid polymer alloy product is then recovered from the mold.

46 Claims, No Drawings

PROCESS FOR PREPARING A POLYMER ALLOY, MOLDED PRODUCT, AND REACTION INJECTION MOLDED PRODUCTS

RELATED APPLICATION

The disclosure of U.S. application Ser. No. 592,081 filed on Mar. 22, 1984, is hereby incorporated by reference, now U.S. Pat. No. 4,582,879.

FIELD OF THE INVENTION

The present invention relates to a process for preparing a polymer alloy and a polymer alloy itself. The present polymer alloy is based on at least one polyamide polymer and at least one of the following: a polyurethane polymer, a polyurea polymer and a polyisocyarurate polymer. The invention further relates to a molded object composed of the polymer alloy itself. The invention furthermore specially relates to a reaction injection molded product composed of an alloy comprising (a) at least one polymer from the group consisting of a polyurethane polymer, polyurea polymer and a polyisocyanurate polymer and (b) a polyamide polymer.

BACKGROUND OF THE INVENTION

Anionic polymerization of a lactam to give nylon has been known for many years.

In connection with nylons in general, the following developments of nylon are broadly germane.

In U.S. Pat. No. 3,018,273, a process for the in situ polymerization of caprolactam is described, wherein an organomagnesium compound is used as as an initiator, and an N,N diacyl compound is used as a promoter (or activator).

British Patent No. 1,067,153 describes a process for preparing nylon-block-copolymers by anionically polymerizing caprolactam in the presence of various initiators suitable for preparing nylon 6 polymers. Preparation of an isocyanate capped polypropylene glycol and a potassium based catalyst is described. A nylon block copolymer containing at least one polyether block is formed.

In U.S. Pat. Nos. 3,862,262, 4,031,164, 4,034,015 and 4,223,112 various aspects of the preparation of nylon block copolymers from caprolactam in the presence of an acyl lactam activator are described. U.S. Pat. No. 3,862,262 describes lactam-polyol-acylpolylactam block-terpolymers. U.S. Pat. No. 4,034,015 is directed to lactam-polyol-polyacyl-lactam or lactam-polyol-acyl-polylactam block terpolymers having at least about 5% ester end group termination. U.S. Pat. Nos. 4,031,164 and 4,223,112 describe lactam-polyolpolyacyl-lactam-block terpolymers having a specified ratio of the various components. More particularly, U.S. Pat. No. 4,031,164 discloses the use of 18 to 90% by weight of polyol blocks in the terpolymer.

U.S. Pat. No. Re. 30,371 describes preparing polyester-polyamide compounds by condensation of an alcohol and acyllactams in the presence of at least one of a Group IA, IIA, IIB, and IIIA metal or metal compound.

U.S. Pat. No. 3,925,325 describes a catalyzed process for the preparation of monomeric and/or polymeric compounds such as esters, polyesters, ester amides, and polyester-polyamides which result from the reaction of an imide and an alcohol in the presence of an organoaluminum, imide-alcohol condensation catalyst.

U.S. Pat. No. 3,965,075 describes using an amide on or organometal compound Group IVA, IB, IVB, VB, VIB, or VIII organometal compound for this condensation.

In European patent application No. 67693, laid open to public inspection on Dec. 22, 1982, acid halide materials and acyllactam functional materials are described as useful in the preparation of nylon block copolymers selected from the group consisting of those having the formula:

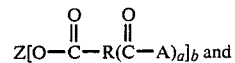 and

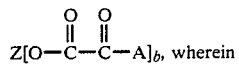 wherein

—A is X or Q, —X is halogen,

Q is N———C=O with

Y

Y is a $C_3-C_{11}$ alkylene group;

a is an integer equal to 1, 2 or 3;

b is an integer equal to or greater than 2;

R is a di- or polyvalent group selected from hydrocarbon groups and hydrocarbon groups containing ether linkages; and Z is a segment of:
(1) a polyether having a minimum molecular weight of 2,000,
(2) a polyester containing polyether segments having minimum molecular weights of about 2000,
(3) a segment of a hydrocarbon or
(4) a polysiloxane.

European patent application No. 67,695, laid open to public inspection on Dec. 22, 1982, describes a process for preparing a nylon block copolymer by reactively contacting a lactam monomer, a basic lactam polymerization catalyst and the acyllactam functional material described in European patent application No. 67,693.

European patent application No. 67,694, laid open for public inspection on Dec. 22, 1982, is directed to acid halide and acyllactam functional materials and to a process for the preparation of nylon block copolymers therewith. The acid halide or acyllactam functional materials are selected from the group defined by a complex formula.

The paper by Sibal et al, "Designing Nylon 6 Polymerization Systems for RIM", apparently presented in part as the 2nd International Conference on Reactive Polymer Processing, Pittsburgh Pa., in November 1982, describes preparing various initiators for anionically polymerizing lactams including a polymeric initiator. This initiator is prepared by reacting hexamethylene diisocyanate (HDI) with a polypropylene oxide diol, having an average molecular weight of 2000, by slow addition of the polyol (1 mole) to two moles of MDI. The resulting product was reacted with anhydrous lactam at 80° C. No mechanical properties data are reported on the final product. Indeed, further work is said to be required to even begin exploring the processability and properties of the products. This paper also reports that reaction ratios and other process governing parameters are not known and further work is required.

U.S. Pat. No. 4,400,490 describes the anionic polymerization of a lactam with an epoxy-compound in the presence of a basic catalyst and a promoter. The epoxy compound can be the reaction product of a polymeric polyol and an epoxy compound.

U.S. Pat. No. 3,793,399 describes the use of a polyol, soluble in molten caprolactam, for improving the impact resistance of polycaprolactam. An organic nitrogen compound is used as a promoter in the polymerization.

The use of etherified polyols in the anionic polymerization of caprolactam is described in U.S. Pat. No. 3,770,689.

Polymerization of nylon in the automotive industry includes the use of "RIM" technology.

Reaction injection molding (RIM) is a one-shot injection method of liquid components usually by impingement into a mold where rapid polymerization occurs resulting in a molded plastic product. The pressures employed are much lower than in conventional injection molding processes. In a RIM process, the viscosity of the materials fed to a mold is about 50 cps to 10,000 cps, preferably about 1500 cps and the injection temperatures varying from room temperature for urethanes to about 150° C. for lactams. Mold temperatures in a RIM process typically range from about 100° to 220° C. The mold pressures generally range from about 1 bar to 100 bar and more particularly the mold pressures range from about 1 bar to about 30 bar. At least one component in the RIM formulation consists of monomers and adducts thereof that are polymerized to a polymer in the mold.

For practical purposes, in a RIM-process the chemical reaction must take place rapidly in less than 2 minutes for smaller items. Presently, urethanes are commercially available for RIM processing although systems based on nylon and epoxy are said to be in development (Polymer Engineering and Science, Dec. 1982, Vol. 22, No. 17, pp. 1143-1152).

Injection molding is another process and is conducted at pressures of about 700 bar to 1400 bar in the mold cavity by melting a solid resin and conveying it into a mold maintained at room temperature while the temperature of the molten resin is about 150° C. to 350° C. At injection temperatures of about 150° C. to 350° C., the viscosity of the molten resin in an injection molding process is generally in the range of 50,000 cps to 1,000,000 cps and typically about 200,000 cps. In injection molding process, solidification of the resin occurs in about 10 seconds to 90 seconds, depending on the size of the molded product, following which, the molded product is removed from the mold. There is no chemical reaction taking place in an injection molding process when the resin is introduced into a mold.

RIM differs from injection molding in a number of important respects. The main distinction between injection molding and RIM resides in the fact that in RIM, a chemical reaction takes place in the mold to transform a monomer or adducts to a polymeric state.

Presently, nylon 6 block copolymers may be candidates for structure panels exposed to the surrounding environment. However, drawbacks weighing against the adaptability of nylon to RIM include the high moisture absorption rate of the product which could adversely affect dimensional stability between demolding, coating and/or application operations. Thus, mechaical properties such as impact strength—especially for the glass fiber filled products—water absorption, and flexural modulus must be improved. Otherwise, there will be obstacles to producing structural penels of nylon block copolymers on a commercial scale.

Another disadvantage of the RIM process for the preparation of nylon block copolymers is as follows. It is not possible to determine the molecular weight (or degree of polymerization) of the nylon blocks independently from the amount of rubber phase used and the molecular weight thereof.

In the anionic polymerization of a lactam, using a polymeric activator, only two degrees of freedom exist, viz. when the molecular weight of the initiator and the amount thereof, which usually determines the amount of rubber, have been fixed, the degree of polymerization is also fixed and vice versa.

It would be very advantageous if the amount of rubber phase incorporated in the system could be independent of the molecular weight of the nylon block in the nylon block copolymer.

The improvement of these properties, and other objects are achieved by the present invention.

SUMMARY AND OBJECTS OF THE INVENTION

The present invention relates to novel polymer alloy compositions and to processes for preparing the novel polymer alloys.

The present invention provides a molded product composed of a polymer alloy of a polyamide polymer and at least one polyurethane polymer, polyurea polymer, andor polyisocyanurate polymer. The polymer alloy is an interpenetrated network of different polymers, a semi-interpenetrating network of different polymers, or a polyblend of different polymers.

Reactant streams containing the compounds for forming the polymers of the polymer alloy are admixed to form a reaction mixture. The liquid reaction mixture is a substantially homogeneous mixture of the reactant compounds. Each reactant stream thus contains only a portion of the components required to obtain the polymer alloy product. The resulting mixture is then introduced into a mold wherein chemical reaction takes place and the polymer alloy forms. Preferably, the mold is heated. The solid polymer alloy product is then recovered from the mold.

According to the present invention, a casting process can also be employed. In such a process the various reactants needed to form the polymers comprising the polymer alloy are rapidly and vigorously mixed in a container at a temperature above the solidification temperature of the mixture. A pouring, i.e. casting, mixture is obtained. Thereafter the casting mixture is poured from the container and introduced into a mold. The mold is preferably heated. The solid polymer alloy product that is obtained following molding is then recovered from the mold.

The present invention further relates to the molded polymer alloy objects obtained by the above-processes.

Advantageously, the present novel products possess enhanced physical properties compared to previously known products.

DETAILED DESCRIPTION OF THE INVENTION

The present invention provides a process for preparing novel polymer alloys.

In the present invention, a polymer alloy is obtained in a mold by introducing a reaction mixture therein and thereafter completing the molding cycle to obtain the polymer alloy product. The reaction mixture is composed of the reactants required to form separately the polymers of the polymer alloy.

Useful molded parts, such as structural panels for vehicles, can be made from the intant novel polymer alloys.

The Polymer Alloy Products

The invention provides novel molded polymer alloy product(s). The polymer alloy product can be prepared by a process comprising forming a mixture from substantially stable reactant streams, introducing the mixture into a mold, allowing the polymer alloy product to be formed and thereafter recovering the product. The process will be detailed hereinafter as another embodiment.

The polymer alloy is composed of at least one polyamide polymer and at least one of the following polymers: polyurethane polymers, polyurea polymers, and polyisocyanurate polymers.

Polyurethane polymers, polyurea polymers and polyisocyanurate polymers are, depending on the chain length, functionality, and kind of polymer chain between linkages, either deemed a generally stiff product or a more or less elastomeric product. For instance, short chain polyols having hydroxy equivalent weights of up to 200, and chains containing cross-linkages in polyurethane, polyurea and polyisocyanurate typically will produce a mainly stiff product. Polyols having long chains and having equivalent weights greater than 500 will generally yield elastomeric products. Advantageously, the amount of long chain polyols in the resulting polymer alloy is in the range of about 5 weight % to 35 weight %, more advantageously, the range is about 5 weight % to 25 weight %.

In the polymer alloy embodiments of the present invention, various weights of the respective polymers may be employed. In general, advantageous weight percents of the polymer components of the high impact strength products of the present invention range from 5 wt.% to 95 wt.% weight percent of polyurethane, polyurea, polyisocyanurate and mixtures thereof, and from 5 to 95 weight percent polyamide. More advantageously, the weight percent of the polyamide polymer ranges from 60 wt.% to 95 wt.%, still more advantageously the polyamide wt.% ranges from 65–95 wt.%. Advantageously, for example, in the polymer alloy embodiment comprising four polymers, the amount of polyamide polymer ranges from about 75 wt.% to 90 wt.%, the polyurea, polyurethane and polyisocyanurate comprise the remaining 10 wt.% to 25 wt.%

Advantageously, in the polymer alloy embodiments comprising three polymers, the amount of the polyamide ranges from about 95 wt.% to about 60 wt.%. and the remainder (the other polymers) is about 5 wt.% to about 40 wt.%. More advantageously, the polyamide amounts range from 65 wt.% to 95 wt.% and still more advantageously from about 75 wt.% to about 90 wt.%.

In the polymer alloy embodiment comprised of the two defined polymers, the weight ratios may vary from 95/5 to 5/95 of the polyamide to the second polymer, more particularly from about 60/40 to about 95/5 and more advantageously, the polyamide ranges from about 65 wt.% to about 95 wt.% and the remaining 5 wt.% to 35 wt.% is a polymer independently selected from the group consisting of polyurethane polymers, polyurea polymers, and polyisocyanurate polymers. Still more advantageously, the polyamide ranges from about 75 wt.% to 90 wt.%. More particularly, in the polyamide/polyurethane polymer alloy, the polyurethane is present in amounts ranging from 5 wt.% to 25 wt.%. The polymer alloy properties may range from, for instance, a reinforced rubber at a 5/95 polyamide/polyurethane ratio to a high impact plastic at a polyamide/polyurethane ratio of 95/5.

The polyisocyanurate, when present, is typically included in at least 5 wt.%.

The respective amounts of the non-polyamide polymers to one another in these embodiments may vary and are determined by the physical properties desired in the final polymer alloy product.

The polymer alloy has useful structural characteristics in addition to variations in polymer composition. The polymer alloy may have different polymeric structures. The different polymeric structures relate to the polymer networks produced during the preparation of the polymer alloy. The networks include a full interpenetrating polymer network, a semi-interpenetrating polymer network, or, for example, a poly-blend.

The different polymer alloy structures are obtained by selecting the polymer forming compounds used to prepare the polymer alloy.

Interpenetrating Polymer Networks

In one embodiment of the present invention the polymer alloy is an interpenetrating polymer network of substantially independently cross-linked (a) polyamides and polyurethanes, (b) polyamides and polyureas, (c) polyamides and polyisocyanurates, (d) polyamides and at least two polymers independently selected from the group consisting of polyureas, polyurethanes, and polyisocyanurates, and (e) polyamides, polyureas, polyurethanes, and polyisocyanurates.

In a full interpenetratiang polymer network, the polymer alloy consists of at least two distinct cross-linked polymer networks which are held together by, for example, permanent entanglements. The cross-linking is essentially homo-cross-linking. The polymers are thus intimately entangled on a molecular scale. For instance, when both the polyamide polymer and the other polymer(s) are cross-linked the resulting product will comprise two intermingled (interpenetrated) cross-linked polymeric structures (full interpenetrating polymer network).

Most advantageously the cross-linking recurs with frequency as this provides alloys having superior physical properties such as high impact strengths.

In the context of interpenetrating polymer networks or the hereinafter described semi-interpenetrating polymer networks, a cross-linked polymer can be considered, for certain embodiments, as a polymer having macrocycles along the polymer chain. Cross-linking of an additional polymer(s) having macrocycles while a first cross-linked polymer is simultaneously (concurrently) formed in the reaction mixture causes a number of macrocycles of the first polymer to the threaded through the macrocycles of the additional polymer(s).

An interpenetrating polymer network can be formed if specific process reaction conditions are employed.

Interpenetrating polymer networks (IPN's) exhibit varying degrees of phase separation, dependent principally on the compatibility of the polymers. With highly incompatible polymers, the thermodynamic forces leading to phase separation are so powerful that separation occurs substantially despite countervailing the kinetic factors. In these cases only small gains in phase mixing occur. In cases where the polymers are more compatible, phase separation can be almost completely circumvented. However, complete compatibility is not necessary to achieve complete phase mixing, since the permanent entanglements (catenation) can effectively prevent phase separation. With intermediate situations of compatibility, intermediate and complex phase behavior results. Thus, interpenetrating polymer networks with dispersed phase domains ranging from a few micrometers incompatible to a few tens nanometers (intermediate), finally to those with no resolvable domain structure (complete mixing) have been reported.

Interpenetrating polymer networks represent a special example of topological isomerism in macromolecules, i.e. different ways of imbedding these molecules in three-dimensional space. Some permanent entanglements between the different crosslinked networks are inevitable in any sufficiently intimate mixture of the crosslinked networks. These represent examples of catenation in polymer systems.

Combining varied chemical types of polymeric networks in different compositions, frequently resulting in controlled but different morphologies, can produce interpenetrating polymer networks with synergistic behaviour. For example, if one polymer is glassy and the other is elastomeric at room temperature, then either a reinforced rubber or a high impact plastic depending on which phase is continuous can be obtained. Known products are described in U.S. Pat. No. 4,302,553 and in Frisch et al, Recent Advances in Interpenetrating Polymer Networks, 22 Poly. Eng. Sci., pp. 1143–1152 (Dec. 1982).

In producing such networks, little or no phase separation occurs during the reaction in the mold. This can be accomplished by suitable choice of the various compounds such as, for example, choosing both polyamide and polyurethane, polyurea, or polyisocyanurate polymer forming compounds which are compatible with each other. Another approach entails controlling the compounds such that the reaction rates of the polyurethane and/or the polyamide reaction are so fast that little or no phase separation occurs.

Semi-Interpenetrating Polymer Network

A polymer alloy product of the present invention having one cross-linked polymer, i.e. one polymer network, is a psuedo interepenetrating network (pseudo IPN or semi IPN). The non-cross-linked polymers of this polymer alloy are linear polymers or branched polymers.

In an embodiment of the present invention either the polyamide polymer or the polyurethane polymer is substantially linear or branched while the other is cross-linked. In that case pseudo or semi-interpenetrating polymer network type of polymer alloy is obtained.

Another of an embodiment of the present invention is a reaction injection molded product composed of: a polyurethane polymer and/or a polyisocyanurate polymer, and a polyamide polymer. In one of the embodiments of the invention, the reaction injection molded product is an interpenetrating polymer network of a polyamide polymer plus a polyurethane polymer and/or a polyisocyanurate polymer, in which the respective polymers are independently cross-linked. By definition, the polyisocyanurate polymer will be cross-linked.

Polymer Blend

In a further embodiment, the novel polymer alloy product according to the present invention is a polymer blend composed of the polyamide polymer and at least one polymer independently selected from the group consisting of polyurethanes and polyureas, wherein all the polymers are substantially linear or branched. Thus, if all polymers are both linear or branched, substantially without cross-linking, a polymeric blend is obtained (poly-blend); the blend is a polymer mixture on a molecular scale which can also provide advantageous properties. This last situation, a polymer blend, is only possible if substantially no polyisocyanurate is formed, as this product is, by definition, cross-linked as will be discussed in more detail hereinbelow.

Terminology

As discussed hereinafter the term polyisocyanurate polymer is intended to define a polymer which in its final form is obtained by trimerization of polyisocyanates. As also discussed hereafter it is quite possible that the polyisocyanurate polymer contains urethane linkages in the chains between two adjacent isocyanurate rings.

Contrary thereto, the term polyurethane polymer is used hereinafter to define a polymer which is obtained by reacting, in the mold, a polyol and a polyisocyanate, substantially without trimerization taking place. Of course, it is quite possible that while reacting the components to form the polyurethane a prepolymer may be present which is obtained by trimerization of diisocyanates. This can especially be the case with the polyisocyanate component.

In terms of chemical structure both the polyisocyanurate polymer and the polyurethane polymer may designate the same final product. However, different definitions are used because each polymer has been prepared by different processes.

In the present invention, the polyurea polymer is used to indicate the product obtained by the reaction of polyisocyanate and polyamine or an equivalent compound such as a hydrazine containing compound. The polymer chains between urea groups may contain isocyanurate groups.

The polyamide polymer in accordance with the present invention is produced via the anionic polymerization of a lactam.

It should be recognized, that while the polyamide polymer, the polyurethane polymer, the polyurea polymer and the polyisocyanurate polymer will be hereinafter described singly in greater detail, the present processes produce a polymer alloy wherein the specified combinations of such polymers are intermingled on a molecular level.

The Polyamide Polymer

The final polymer alloy includes a polyamide polymer as an essential polymer component.

The polyamide is mainly a stiff polymer and a relatively inflexible polymer. However, depending on the amount of the rubbery component which can be incorporated in the polyamide by way of the anionic polymerization activator having long-linear chains, the polyamide polymer can have properties which are close to elastomeric products.

Advantageously, the polyamide is produced by the anhydrous anionic polymerization of a lactam. Anhydrous conditions are usually obtained by distilling off any water from the reaction solvents. In the present invention the lactam is a solvent. Thus, any water is distilled off along with some of the lactam to obtain an anhydrous lactam solvent. The anionic polymerization process is thus quite distinct from hydrolytically polymerizing lactams wherein water initiates the reaction. The latter process is characterized by unduly long (several hours) reaction times.

Lactams suitable for preparing the polyamide component of the polymer alloy are characterized by the following formula:

wherein x is an alkylene group, substitued or unsubstituted, having from 3 to 14 carbon atoms, from 4 to 14 carbon atoms, and more advantageously from 3 to 11 carbon atoms. Exemplary lactams comprise 2-pyrrolidone, 2-piperidone, caprolactam and lauryllactam. Mixtures of two or more lactams can be used. Preferably and advantageously caprolactam is employed in order to yield a product having superior physical properties. Advantageously, the polymerization rate of caprolactam is quite rapid. Advantageously, the polyamide forming compounds anionically polymerize to yield nylon 6 homopolymers, nylon 6 random copolymers, or nylon 6 block copolymers. The anionic polymerization of the lactam occurs in the presence of a polymerization catalyst and an activator.

Various known anionic polymerization catalysts can be used such us, for example, sodium lactamate, potassium lactamate or any one of the Grignard compounds such as bromomagnesium lactamate. Mixtures of catalysts may be employed. These catalysts can be used as such, or in the form of a compound which reacts to yield such a catalyst, such as an alkali metal. The amount of catalyst can vary within wide ranges, such as from as low as 0.05 eq. % to as high as 10 eq. % with respect to the lactam. An advantageous range is from about 0.5 eq. % to 2.0 eq. %.

Numerous activators for the polymerization of lactam can be used in the present invention. The activator, or promoter as it is sometimes called, can advantageously comprise one or more compounds selected from the group of lactam blocked isocyanates, and may also comprise lactam blocked polyurethanes, acyl lactam compounds.

As already indicated, the specific reactive compounds employed in the present process determine the type of polyamide obtained as well as its characteristics.

The functionality of the activator determines whether a linear or a branched polyamide is obtained. The polyamide chains are chemically bound to the activator compound at the locus of the activator group. Thus, a di-functional activator results in a linear polyamide whereas a tri-functional or higher-functional activator results in a branched polyamide.

A suitable activator is a lactam-blocked-isocyanate activator. For example, using an activator having a functionality of at least 3 results in a substantial amount of cross-linking resulting in a polyamide network. Suitable activators include, for instance, a lactam blocked diisocyanate, a lactam blocked triisocyanate, an acyllactam compound or an an acyl halide compound of low molecular weight, i.e. lower than about 500.

In another embodiment, the activator is the reaction product of an organic hydroxy compound and a compound providing activator groups. First, the organic hydroxy compounds have at least two available reactive hydroxyl groups. Generally, the known polyols may be employed. Advantageously, the polyol is a polyether polyol, polyester polyol, polybutadiene polyol, siloxane containing polyol, polyisobutylene polyol, polycarbonate polyol, and/or a so-called "polymer" polyol (a special polyether polyol). The "polymer" polyols as defined herein include graft polymers obtained by grafting one or more ethylenically unsaturated monomers onto a polyether polyol. Also polyurea dispersions in polyols can be used as such. Thes polyurea dispersions can be obtained by dissolving a diamine or hydrazine in a polyol and adding a diisocyanate in a stoichiometric amount to the diamine with vigorous agitation to form a polyurea compound dispersed in the polyol.

The amount of the ethylenically unsaturated monomer grafted in the polyol ranges from 10% by weight to 35% by weight on the final grafted product ("polymer" polyol). Examples of suitable grafting monomers are especially acrylonitrile or a mixture of styrene and acrylonitrile. A suitable product of this type is known as Niax 3128 (Union Carbide Corp.). Likewise, the amount of polyurea dispersed in the polyol is from 10-35% by weight of the total dispersion.

These polyols are advantageously used in the preparation of nylon block copolymers. Such nylon block copolymers have a higher flexural modulus while, surprisingly, avoiding a decrease in impact resistance.

In this context, the polyurea dispersion described with reference to polyols does not have the same connotation as the polyurea polymer prepared during the present process for producing the novel polymer alloy. An essential aspect of the polyurea polymer in a polymer alloy embodiment of the present invention resides in the substantially simultaneous preparation thereof with the polyamide whereas the polyurea dispersions described with reference to polyols have been previously prepared for subsequent use in the molding process.

Other exemplary polyols that can advantageously be used include the following: poly(oxyethylene) and poly(oxypropylene) polyols; adducts or blends of diols, triols, and tetraols; polyols with polyether segments containing polyesters; polyester polyamine-polyols; and polylactones. Polyols obtained by ethoxylating and/or propoxylating ethylene diamine, glucose, fructose, sucrose or trimethylolpropane are also suitable.

The above-described polyols generally have a relatively high molecular weight. Advantageously, the equivalent weight of these polyols is at least 100, more advantageously ranges between about 100 and about 3000, and still more advantageously ranges from about 500 to about 2,500. In general, the polyols preferably and advantageously have an equivalent weight of at least 300. In these ranges optimal properties of the final object are obtained, viz a high impact-strength combined with a high flexural modulus without problems in preparing the activator, due to high viscosity.

Advantageously, the hydroxy functionality of the polyol used is from 2 to 10 and more advantageously the hydroxy functionality 2 to 4. Especially advantageous is the use of a three- or four-hydroxy functional polyol in preparing cross-linked nylon 6 copolymers.

Any molecular weight or equivalent weight referred to herein means a numerical average weight. Furthermore, the term equivalent weight of a polyol is understood to mean the numerical average weight of the polyol per hydroxyl group, i.e. the molecular weight divided by the functionality.

Second, the compound providing activator groups is advantageously selected from the group consisting of lactam terminated diisocyanates, lactam terminated polyurethanes, lactam terminated polyureas, diacyl lactam compounds or diacyl halide compounds.

A lactam blocked diisocyanate is used as such or to prepare the polymerization activator. The lactam blocked diisocyanate can be prepared by reacting a lactam with a diisocyanate or a triisocyanate such as, for example, 1,3,5-tri(isocyanatohexamethyl) biuret (Desmodur L-2291A, Mobay Chemical Corp.). An exemplary lactam is caprolactam. Suitable diisocyanates include hexamethylene diisocyanate (HDI), isophorone diisocyanate, toluene diisocyanate, methylene bis(phenyl-isocyanate) (MDI) and hydrogenated MDI, or modified MDI such as carbodiimide modified MDI, (Isonate 143L, Upjohn Company or Mondur PF, Mobay Chemical Corporation) and diol extended prepolymers of MDI(Isonate 181, or Isonate 191). Additional isocyanates include xylylene diisocyanate (XDI), hydrogenated xylylene diisocyanate ($H_6XDI$), and hydrogenated toluene diisocyanate. Advantageously, the aliphatic diisocyanates, such as, hexamethylene diisocyanate, isophorone diisocyanate, hydrogenated MDI, hydrogenated xylxylene diisocyanates and hydrogenated toluene diisocyanate are used because the lactum blocked with aliphatic diisocyanates, mentioned hereinbefore, provides the fastest lactam polymerization rates.

The diacyl lactam compound, includes, for example, terephthaloylbis caprolactam, adipoyl biscaprolactam, oxaloylbis caprolactam, isophtaloyl biscaprolactam or mixtures of two or more of these compounds.

The suitable diacylhalide compounds for preparing acylhalide-terminated polyols include the halides corresponding to the above diacyllactam compounds. For example with diacylhalide the reaction with the polyol is simply an ester-forming reaction. The reaction is preferably conducted in the presence of a basic compound which reacts with the hydrogen halide formed in this reaction: the hydrogen halide can also be driven off by heat. This reaction product, an acylhalide-terminated polyol, is thereafter reacted with lactam to yield an activator for the lactam polymerization.

The reaction of the lactam terminated isocyanate or the acyllactam compound with the polyol requires the presence of at least one catalyst. In general, suitable catalysts are, for instance, the metals and metal compounds of Group IA of the Periodic Table as well as the Lewis acids. Examples of advantageous catalysts are sodium, potassium, magnesium, and compounds thereof. Compounds of copper, tin, titanium, vanadium, chromium, manganese, iron, cobalt, nickel, calcium, zinc, and barium are also suitable. Exemplary suitable metal compounds include acetylacetonates, chlorides, bromides, lactamates, alcoholates such as methoxides and ethoxides, and carboxylates, such as acetates. Catalysts thus include, for example, sodium lactamate, potassium lactamate, magnesium chloride, magnesium bromide, Grignard compounds, Cu (II) acetylacetonate, Sn (II) chloride, Sn (II) ethoxide, Sn (II) acetylacetonate, Ti (III) chloride, Ti (III) acetylacetonate, Ti (III) ethoxide, V (III) ethoxide, V (III) acetylacetonate, V (III) chloride, Cr (III) chloride, Cr (III) acetylacetonate, Mn (II) chloride, Mn (II) acetylacetonate, Fe (III) chloride, Fe (III) acetylacetonate, Co (III) chloride, Co (II) acetylacetonate, nickel acetylacetonate, nickel chloride, Cr (III) acetylacetonate, calcium ethoxide, calcium acetylacetonate, barium lactamate, barium chloride, barium acetylacetonate, and the chlorides, lactamates and acetylacetonates of zinc, calcium and aluminium.

The molar ratio of the polyol and the compound providing activator groups depends on the functionality of these compounds as well as on the amount of available reactive activatior groups present in the activator. For example, if one mole of a diol is reacted with two moles of a diacylcompound, then, on average, every hydroxyl group will have reacted with one diacyl compound. Using 1.5 moles of a diacyl compound, a product is obtained wherein, on average, two diols are coupled to each other by one diacyl molecule (diacyl-diol-diacyl-diol-diacyl) (chain-extension).

Isocyanate-terminated urethane prepolymers can also be used for preparing lactam blocked compounds which are to be used as activator for the anionic polymerization of lactam. The lactam blocked compounds are prepared by the reaction of the isocyanate-terminated prepolymer with lactam at an isocyanate/lactam equivalent ratio of about 1:1. The isocyanate terminated-prepolymers are prepared by the reaction of a diisocyanate with a diol or triol of polyoxyalkylene ether glycol or of polyether diol and an isocyanate to hydroxy equivalent ratio of at least 2. More particularly, the activator is the reaction product of an isocyanate-terminated urethane prepolymer with ε-caprolactam.

Using an activator prepared, in part, from a polyol, the polyamide polymer in the polymer alloy product is a nylon block copolymer having at least one polyol-block and, depending on the number of hydroxyl groups in the polyol, two or more nylon blocks.

The polyamide prepared in accordance with the above description (if a difunctional compound yielding activator groups is used) can be a compound of the formula:

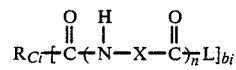

wherein

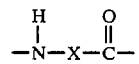

represents the opened lactam ring,

X is a substituted or unsubstituted alkylene group having 3 to 14 carbon atoms and advantageously from 3 to 12 carbon atoms, X is the alkylene group residue from the lactam ring, $b_i$ is an integer $\geq 2$, preferably and advantageously not greater than 4, Ci is an index relating to R, Ci is 0 or 1, wherein when $Ci=0$ then $b_i=2$, n is the degree of polymerization for each nylon block, and preferably and advantageously $10 > n \leq 1000$, L is 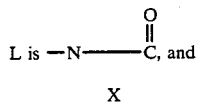, and R has the following configuration

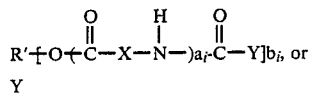

wherein
R' is a residue hydrocarbon radical derived from a polyol, such as
a polyether polyol,
a polybutadiene polyol,
a polyester polyol containing one or more polyether blocks, or
a grafted polyether polyol,
$a_i$ has a value $\geq o$, and
Y is:

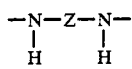

a hydrocarbon radical,
an ether radical, and
Z is the divalent hydrocarbon residue from a diisocyanate.

The value of $b_i$ corresponds to the functionality of the hydroxy compound used. Thus, this value also corresponds with the functionality of the activator. If a pure compound is used then $b_i$ is an integer. However, if a mixture of two or more different hydroxy compounds is used, then the value of $b_i$ is the mean value of the functionality; the mean value, of course, may not necessarily be an integer. For example, if a mixture of 25 mole % of a diol, and 75 mole % of a tetrol having the same molecular weight are used, then the value of $b_i$ will be 3.5.

Depending on the method used to prepare the activator compound, $a_i$ can have a specific value. If a lactam compound is used, or if molten lactam is used as a solvent, then it is possible that a certain amount of lactam blocks are incorporated in the activator. In that case $a_i$ is greater than zero. Of course, it is possible that if $b_i$ is greater than one, that in one nylon block copolymer, for each group $a_i$ has another value.

The Sibal et al method yields a polyamide having $a_i$ = zero since no lactam is present during the reaction of polyol and diisocyanate. A like result is obtained using the diacyl-halide compounds described in, for instance, the European patent application Nos. 67693, 67694 and 67695, laid open for public inspection on or about Dec. 22, 1982.

However, when a diacyllactam compound is prepared from a diacyllactam and a polyol, as described in U.S. Pat. No. 3,862,262, a part of the lactam will be incorporated in the activator, whereas another part will split off. The value of $a_i$ will then be between 0 and The above-formula assumes that a di-functional compound providing activator groups is used. In the event a mono-functional, tri-functional or multi-functional compound providing activator groups is used, those skilled in the art can take into account the chemical structure of the compound so that the various parameters in the formula can appropriately be changed.

The ratios of the various polyamide forming components depend on their functionality and on the properties which are required in the end product, such as impact strength, flexural modulus and heat distortion temperature.

Generally, with a nylon block copolymer having a rubbery component based on a polyol(s), the amount of the rubbery component ranges from 5 wt. % to 35 wt. %. More advantageously, the amount of polyol ranges from 5 wt. % to 25 wt. % with respect to the total amount of polyurethane and polyamide.

Combining the preferred and advantageous polyols and having a hydroxyl functionality of 2 to 10, and more advantageously of 2 to 4, with a di-functional compound providing activator groups, such as a diacylfunctional compound or a diisocyanate-functional compound, yields polymeric activators having 2 to 10, more advantageously 2 to 4, activator groups per molecule, provided that no chain extension has occurred, as described hereinabove.

A nylon homopolymer is obtained by polymerizing a lactam with a low molecular weight activator, such as caprolactam terminated 1,6-hexamethylene diisocyanate or terephthaloyl biscaprolactam. In the case of caprolactam, a nylon-6 homopolymer is obtained. Nylon-6 copolymers are obtained by polymerizing caprolactam, together with at least one other lactam, such as lauryl lactam, using the same low molecular weight polymerization activators as used for the preparation of nylon-6 homopolymers.

In the RIM embodiment, at least about 1.2 equivalent % of activator groups must be present. Otherwise the reaction rate is too low and hence unacceptable.

Advantageously the polymer alloy product comprises a nylon-6 homopolymer, in combination with compounds forming an elastomeric polyurethane polymer, polyurea polymer and/or a polyisocyanurate polymer.

The Polyurea Polymer

The polyurea polymer forming compounds comprise at least one polyamine or hydrazine containing compound, at least one polyisocyanate and, optionally, at least one urea polymerization catalyst.

In the present polymer alloy the term polyurea polymer indicates the polymer obtained by the reaction of polyisocyanate with a polyamine compound. The polyurea polymer forms during the molding process. The polyamine compound is preferably an amine-terminated polyether having at least two amine groups or a compound containing hydrazine groups. The polyurea polymer forms during the molding process.

Controlling the combination of reactants governs the polymer chain architecture of the polyurea polymer obtained in the final polymer alloy product. For example, controllably and selectively correlating reactants enables the practitioner to obtain a linear or a cross-linked product (network). A cross-linked polyurea may be obtained with various combinations of polyisocyanates and polyamines. For example, such combinations could include a diisocyanate and three or higher functional polyamine, an NCO terminated prepolymer (from diisocyanate and diol or diamine) and a three or higher functional polyamine, a triisocyanate and two or higher functional polyamine. A linear polyurea can be obtained by reacting approximately equivalent amounts of a diisocyanate and a difunctional polyamine.

Advantageously, polyamines are the source at least a part of the reactive amino groups required for the in-mold polyurea polymerization. Suitable polyamines have equivalent weights of 100 to 3000 and, more advantageously the equivalent weights range between 1,000 and 2,500. The polyamines advantageously contain 2 to 4 amine groups per molecule. Suitable amines are disclosed in U.S. Pat. No. 4,396,729 the disclosure of which is hereby incorporated by reference. Suitable amines include 1-methyl-3,5-diethyl-2,4 diaminobenzene and 1-methyl-3,5 diethyl-2,6 diaminobenzene (both of these materials are also called diethyltoluene diamine or detda), 1,3,5-triethyl-2,6 diaminobenzene, 3,5,3',5'-tetraethyl-4,4'' diaminodiphenylmethane, 2,4- and 2,6-diaminotoluene, 2,4'- and/or 4,4'-diaminodiphenylmethane, 1,3- and 1,4-phenylenediamine, naphthylene-1,5-diamine and triphenylmethane-4,4',4''-triamine. Difunctional or higher polyfunctional aromatic amino compounds wherein some or all of the amino groups are secondary amino groups are also suitable and include, for example, 4,4'-di-(methylamino)-diphenylmethane or 1-methyl-2-methylamino-4-aminobenzene. Liquid mixtures of polyphenylpolymethylene polyamines of the type obtained by aniline-formaldehyde condensation, methylene-bis-chloroaniline, 1,3-diethyl-2,4 diaminobenzene, and 2,4-diaminomesitylene. Primary and secondary amine terminated polyethers such as Jeffamine D-2000 and Jeffamine T-3000 are additional exemplary compounds. The above mentioned amines may be used either alone or in mixtures with each other. Suitable exemplary catalysts are, for instance, tertiary amine containing compounds. A catalyst is not absolutely necessary because the nitrogen present in the polyamine or hydrazine containing compound catalyses the reaction with isocyanate.

The organic polyisocyanates which are suitable for use herein include aromatic, aliphatic, araliphatic or cycloaliphatic polyisocyanates or diisocyanates in pure or crude form. Exemplary diisocyanates include toluene diisocyanate (TDI), 4,4'diphenylmethane diisocyanate (MDI), polymethylene polyphenylisocyanates, isophorone diisocyanate (IPDI), 1,6 hexamethylene diisocyanate (HDI), xylylene diisocyanate (XDI) as well as modified MDI for example carbodiimide-modified MDI. Cyclic aliphatic diisocyanates include hydrogenated aromatic diisocyanates such as hydrogenated MDI, TDI or XDI. Aliphatic triisocyanates include trimers derived from isophorone diisocyanate. Exemplary diisocyanate adducts include adducts of, for instance, toluene diisocyanate, 4,4'diphenyl methane diisocyanate, and/or 1,6-hexamethylene diisocyanate with trimethyolpropane. Advantageously and thus preferably, aromatic diisocyanates such as MDI, carbodiimide-modified MDI and toluene diisocyanate, are utilized in the in-mold polyurea polymerization. Suitable polyisocyanates are also described herein with respect to the polyurethane component of the novel polymer alloy.

The ratio of terminal isocyanate groups in the polyisocyanate to the amount of amine groups used for the urea reaction is 1.00:1 to 1.05:1.

A catalyst is not necessary because the isocyanate-amine reaction is very rapid. Suitable optional catalysts are, for example, tertiary amine containing compounds.

The Polyurethane Polymer

The polyurethane forming compounds comprise at least one polyol, at least one polyisocyanate and at least one polymerization catalyst.

As indicated hereinbefore, the type of polyurethane obtained in the final polymer alloy product is determined by controlling the combination of polyurethane forming compounds used. Controllably and selectively correlating reactants enables the practitioner to obtain a linear or a cross-linked product. A cross-linked polyurethane may be obtained from various combinations of polyisocyanates and polyols. For example, such combinations include a diisocyanate and a three or higher functional polyol, a NCO terminated prepolymer (from a diisocyanate and a diol) and a three or higher OH-functional polyol, a tri-isocyanate and two or higher functional polyol. Reacting approximately equivalent amounts of a diisocyanate and a difunctional polyol produces a linear polyurethane. Preferably a slight excess of isocyanate is employed.

Advantageously, at least a part of the hydroxyl groups required for the polyurethane reaction are provided by polyols having equivalent weights of 100 to 3000 and, more advantageously the equivalent weights range between 1,000 and 2,500. Even more advantageously, the polyols have equivalent weights ranging from 1,000 to 2,500 and have 2 to 4 hydroxyl groups per molecule.

In a preferred embodiment, the polyol is selected from the group consisting of polyoxyalkene polyols containing $C_2$ to $C_4$ oxyalkene units, addition products of a $C_2$ to $C_3$ alkene oxide to a trihydroxy compound, polylactone-diols and triols derived from $C_5$ to $C_{12}$ lactones, hydroxyl terminated polyesters, polyacrylates containing hydroxyl groups and graft polymers containing hydroxyl groups and having chains based on acylonitrile or mixtures of acrylonitrile and styrene (hereinbefore designated as polymer polyols).

Suitable exemplary polyols are further described as follows. Polyoxyalkene glycols containing $C_2$ to $C_4$ oxyalkylene units such as polyethyleneglycol, polypropyleneglycol, polytetramethyleneglycol and random or block copolymers of ethylene oxide and propylene oxide are suitable as are polylactone polyols derived from for example, a $C_5$ to $C_{12}$ ring lactone. The alkylene group of the lactone ring can have alkyl, cycloalkyl, alkoxy and aromatic (single and multi ring) substituents. Polylactone polyols can be obtained by polymerizing caprolactone, valerolactone or oenantholactone in the presence of a polyfunctional initiator, di-hydroxyl-terminated polyesters, polycarbonate-diols, polyacrylates containing polyhydroxyl groups, polybutadienes containing hydroxyl groups, graft polymers containing hydroxyl groups wherein the polymer chains are based on, for instance, acrylonitrile, styrene or combinations thereof, and addition products of ethylene oxide or propylene oxide with a polyfunctional organic hydroxy compound (preferably a trifunctional hydroxy compound such as glycerol or trimethylolpropane). Polyesters can function as suitable polymer polyols and are obtained by reacting at least one $C_4$ to $C_{12}$ aliphatic and/or aromatic carboxylic acid with at least one $C_2$ to $C_{12}$ aliphatic and/or cycloaliphatic diol. Suitable exemplary carboxylic acids include adipic acid, azelaic acid, phthalic acid and terephthalic acid. Suitable exemplary diols include ethylene glycol, diethylene glycol, 1,4-butane diol, 1,6-hexane diol, propylene glycol, or 1,4-(hydroxymethyl)-cyclohexane, in proportions to provide dihydroxyl terminated polyesters. Polyurea dispersions, as distinguished from the polyurea polymer prepared in the mold, are also suitable. Polyurea-dispersions described above with respect to the activator for the lactam polymerization are also useful.

In an embodiment of the invention, a low molecular weight compound which functions as chain extender is used in addition to the polymeric polyol. Suitable chain extending compounds have a molecular weight of from 62 up to and including 350. Preferably the chain extender is a polyol and advantageously the low molecular weight compound is a diol. More advantageously, the chain extender is an aliphatic diol having 2 to 6 carbon atoms. The amount of the low molecular weight diol is less than 50 wt % of the polyols used. Advantageously, the amount of the low molecular weight diol is between 10 wt % and 30 wt % of the polyols used. Examples of suitable polyol chain extenders include aliphatic unbranched diols such as ethylene glycol, 1,3-propylene glycol, 1,4-butanediol, 1,5-pentane diol, 1,6-hexanediol and 1,10-decanediol; branched diols such as 1,2-propane diol, 1,2-butane diol, 1,3-butane diol and 2,2-dimethyl-1,4-butanediol; low molecular weight polyalkylene glycols such as diethylene glycol, triethylene glycol, dipropylene glycol and 2-hydroxyethoxy-1-propanol; or cycloaliphatic diols such as 1,4-(hydroxymethyl)-cyclohexane or bishydroxymethyl-hydroquinone. Triols such as glycerol and trimethylolpropane are also suitable. Mixtures of these compounds can be used.

The polyisocyanates and/or diisocyanates used to produce the urethane component of the novel polymer alloy include aromatic, aliphatic, aralkyl or cycloaliphatic polyisocyanates and/or diisocyanates in pure or crude form. Exemplary suitable diisocyanates include toluene diisocyanates (TDI), 4,4'diphenylmethane diisocyanate (MDI), isophorone diisocyanate (IPDI), hexamethylene diisocyanate (HDI), xylylene diisocyanate (XDI), carbodiimide modified MDI, hydrogenated aromatic diisocyanates like hydrogenated MDI, TDI or XDI. Additional exemplary suitable polyisocyanates include the polyfunctional isocyanates obtained by catalytic trimerization of a diisocyanate (such as a trimer derived from IPDI) or a isocyanate-terminated polyether triol obtained by the reaction of one mole of a polyisocyanates are also described herein with respect to the polyurea component.

The ratio of terminal isocyanate groups in the polyisocyanate to the amount of hydroxyl groups used for the urethane reaction is 1.00:1 to 1.05:1.

At least one catalyst is usually used to accelerate the urethane reaction. Exemplary urethane catalysts include the tertiary amines, such as, triethylene diamine, triethylamine, and tin containing compounds, such as the tin salts of carboxylic acids including dibutyltin diacetate, dibutyltin dilaurate or stannous octoate.

In the present invention the term polyurethane polymer is used to indicate the product obtained by the reaction of polyisocyanate and polyol, in the absence of a substantial amount of trimerization occurring. Additionally, it should be understood that the polymer chain between urethane bonds may contain isocyanurate groups. Nonetheless, the decisive point being is the polyurethane polymer forms during the molding process.

The Polyisocyanurate

The polyisocyanurate polymer, as used herein, means the polymer obtained by the in situ trimerization of polyisocyanurate in the mold. The in-mold urea or urethane reaction of prepolymers having isocyanurate groups is not intended to be encompassed by this definition. Such products are, depending on the reactants involved, either polyurea polymers or polyurethane polymers for the purposes of this invention.

The polyisocyanurate polymer is formed during molding from polyisocyanurate polymer forming compounds. The polyisocyanurate polymer forming compounds comprise a trimerization catalyst and the compounds reacting to give the polyisocyanurate, in otherwords a prepolymer containing isocyanate groups or a polyol and a diisocyanate. Thus, for example, an isocyanate-terminated prepolymer is trimerized in the presence of a trimerization catalyst. Advantageously, the polyisocyanurate polymer is formed from urethane-modified polyisocyanate prepolymers. A diisocyanate and a polyol can be reacted in the presence of a trimerization catalyst at an NCO/OH ratio of at least 1.2 and more advantageously at least 1.5. The equivalent ratio of NCO/OH groups may range from 1 to 10, more preferably from 1.3 to 5.0 and still more advantageously from about 1.5 and 3.0.

By definition trimerization of a polyfunctional isocyanate results in a polymer network. Consequently, a polymer alloy prepared from a reaction mixture containing an effective amount of polyisocyanurate forming compounds will be either an interpenetrating polymer network or a semi-interpenetrating polymer network. An effective amount of the polyisocyanurate forming compounds is at least 5 wt.% used to prepare the polymer alloy. Advantageously, the effective amount ranges from 15% by weight to 35% by weight of the reaction mixture and more advantageously from 20% by weight to 30% by weight.

Compounds which catalyze the trimerization of isocyanate groups to isocyanurate are suitable catalysts. Exemplary compounds include the alkali metal lactamates such as sodium lactamate or potassium lactamate; hexahydrotriazine derivatives such as 1,3,5 tris(dimethylaminopropyl)hexahydrotriazine; Zwitter ion compounds such as sulfonium Zwitter ions and amine-imide Zwitter ions; tertiary alkanolamine compounds such as Dabco-T; alkali metal carboxylates such as potassium octoate or potassium acetate; tertiary amines in combination with epoxy compounds such as alkali metal carboxylates; tertiary amines in combination with organo-metallic compounds; tertiary amines in combination with alkylene-oxide such as ethylene oxide or propylene oxide and an organic acid (quaternary ammonium carboxylates) such as Dabco TMR; and combinations of catalysts. A polyurethane catalyst can be used together with a trimerization catalyst when a polyol and a polyisocyanate are the polyisocyanurate forming polymer components.

In a preferred embodiment, a lactamate catalyst is used as the trimerization catalyst because the lactamate catalyst also catalyzes the lactam polymerization-reaction. Thus one less component is needed to produce the polymer alloy.

Depending on the nature of the compounds used for the trimerization, it is possible to use a one step or two-step trimerization technique.

The one-step process is advantageously described in connection with a two stream system. The dual reaction stream means the one-step technique necessarily requires two components. In the one-step, two-component process, both a polyol and a polyisocyanate are introduced together into the mixture and trimerized with the aid of a suitable catalyst in the mold to yield a polyisocyanurate polymeric network. The one-step method has fast gel times. For example, stream A comprises caprolactam, potassium lactamate or sodium lactamate, at least one polyol and a tin catalyst whereas Stream B comprises a caprolactam blocked adduct and a diisocyanate.

Various adducts can be advantageously used in the one-step technique. Exemplary advantageous adducts include a caprolactam blocked adduct of a poly(oxypropylene) glycol/1,6-hexamethylene diisocyanate prepolymer having an isocyanate to hydroxyl ratio of about 2:1 to about 3:1 or a caprolactam adduct of Demodur L 2291 A. The latter adduct is most advantageous since the isocyanate source is not monomeric.

In the two-step process, also known herein as the one-component system or prepolymer process, a polyisocyanate compound having terminal isocyanate groups is trimerized to yield a polymeric network in the presence of a trimerization catalyst and, optionally, in combination with a small amount of chain extender. Advantageously, the polyisocyanate compound having terminal isocyanate groups is a isocyanate-terminated urethane prepolymer. This amount of chain extender will not exceed 10% by weight of the components used to build the isocyanurate polymeric network. The polyisocyanurate polymeric network is generally intended to impart elastomeric properties to the polymer product and, accordingly, a relatively long chain should be present between two isocyanurate groups. A prepolymer for such a polyisocyanurate network is obtained, in general, by reacting a polyol having elastomeric properties with an excess of diisocyanate yields an isocyanate terminated polyurethane prepolymer. This isocyanate terminated prepolymer is then reacted to yield the polyisocyanurate polymer network. Advantageously, the two-step (pre-polymer) process provides fast reactions, polymer alloys having superior flexural modulous properties, and polymer alloys having superior Izod impact strengths.

An exemplary molding procedure for the two-step process is as follows. Two reactant streams A and B are prepared. Stream A comprises caprolactam and potassium lactamate. Stream B comprises a suitable adduct and a suitable prepolymer. Containers for both Stream A and Stream B are heated to 95° C. in an oil bath and each container is purged with dried nitrogen gas. Stream A and Stream B are then admixed with vigorous agitation for a few seconds. The mixture can then be poured (casting process) or injected into the mold. Advantageously, the mold walls are relatively thick to avoid fluctuations in temperature of the mixture during molding. More advantageously, an oil-heated mold is used for even heat distribution.

Typically the polymer alloy is formed within about 1 to 3 minutes at temperatures ranging from 140° C. to 160° C. Advantageously, molding at lower termperatures, such as 140° C., yields products having higher flexural modulus values than products obtained at 160° C.

The two-step one component process, however, is more advantageous than the one-step process because the reaction is more easily controlled. In the one-step process some simultaneous trimerization and urethane formation occurs thus making it difficult to control the relative rates of reaction between the various components and the ratios of the reactants yielding these different products.

Suitable polyols and suitable polyisocyanates for use in either the one step method or the two step method are essentially the same as those that are described hereinbefore with respect to the preparation of the polyurethane. More particularly, suitable di-functional polyols include poly(oxypropylene) glycols, poly(oxytetramethylene ether) glycols, poly(oxyethylene) glycols, terephthalate based polyesters, polycarbonate diols, polybutadiene diols and polyisobutylene diols. Advantageously, suitable diols have an equivalent weight ranging from 500 to 2000. Suitable trifunctional polyols are the glycerol based polyethers and the trimethylol propane based polyethers. Advantageously, suitable trifunctional polyols have an equivalent weight from 500 to 2000.

Advantageously, the diisocyanates used in either the one step or the two step process for preparing the polyisocyanurate network include the aromatic diisocyanates, although aliphatic isocyanates can be used. Aromatic polyisocyanates are advantageous and thus preferred because the polyisocyanurate reaction is then the fastest. For an enumeration of exemplary suitable aromatic diisocyanates refer to the description of the polyurea and polyurethane polymer components.

In the one-step process it is necessary to use both the polyisocyanate and polyol polymer precursor compounds in such proportions that both the urethane reaction and the trimerization can occur simultaneously.

Exemplary process streams for the one step process and the two step process wherein a polymer alloy composed of a polyamide and a polyisocyanurate is obtained are as follows:

A. One-Step Process

Stream A
 caprolactam
 lactam catalyst
 polyol
 tin catalyst
Stream B
 caprolactam adduct
 polyisocyanate B. Two-Step Process (Prepolymer Process)

Stream A
 caprolactam
 lactam catalyst
Stream B
 caprolactam adduct
 isocyanate-terminated prepolymer Processes for Preparing the Polymer Alloy The processes according to the present invention for producing the novel polymer alloys are now described as follows.

A process includes the following steps. Reactant streams are prepared which contain the polymer forming components for polyamide polymers, and at least one polyurethane polymer, polyurea polymer and/or polyisocyanurate polymer. Generally, the individual reaction streams, or flows, severally do not each contain all the components for forming an individual polymer component of the polymer alloy. The unmixed reactant streams are, individually, substantially stable; the streams are maintained separate since reactions occur quickly once the streams are mixed. The reactant streams are then rapidly, vigorously admixed so that the polymer alloy reaction mixture (composed of the reactant streams) is formed. The reaction mixture is thoroughly admixed during preparation because the polymer alloy products obtained therefrom have consistent physical properties, i.e. the properties will be more uniform for a given polymer alloy product which is produced. The mixture is then conveyed, i.e. rapidly introduced, into a mold.

A molded polymer alloy product composed of the polymers is formed in situ in the mold. Because the polyurethane polymer forming compounds, the polyisocyanurate polymer forming compounds, and/or the polyurea polymer forming compounds plus the polyamide polymer forming compounds, respectively, and essentially simultaneously, react to form intermixed polyurethane polymers, polyurea polymers, and/or polyisocyanurate polymers and polyamide polymers. As is thus apparent, the polymer alloy includes at least one polyamide polymer and one or more of the above-mentioned polymers. Thereafter, the polymer alloy is recovered from the mold.

The reaction mixture contains (1) polymer forming compounds for forming at least one polymer from the group consisting of polyurethane polymers, polyurea polymers and polyisocyanurate polymers plus (2) polyamide polymer forming compounds. The polyurethane polymer forming compounds comprise a polyol, a polyisocyanate, and a polyurethane polymerization catalyst. The polyurea polymer forming compounds comprise a polyamine a polyisocyanate and optionally a urea polymerization catalyst. The polyisocyanurate polymer forming compounds comprise a prepolymer containing at least two isocyanate groups, or a polyol and a polyisocyanate, and a trimerization catalyst. A urethane catalyst may, if desired, be used. The polyamide polymer forming compounds comprise at least one lactam, an anionic polymerization catalyst and a polymerization activator.

More particularly, in accordance with the present process various polymer alloys are obtained. The constituency of and properties of the polymer alloy may be varied depending on the combinations of polymer forming compounds in the reaction mixture and, for example, the amount of the polymer forming compounds used. For instance, a polymer alloy embodiment of the present invention is composed of a polyamide polymer and a polyurethane polymer; a polyamide polymer and a polyisocyanurate polymer; a polyamide polymer and a polyurea polymer; a polyamide polymer, a polyurethane polymer and a polyisocyanurate polymer; a polyamide polymer, a polyurea polymer and a polyisocyanurate polymer; or a polyamide polymer, a polyurethane polymer, a polyurea polymer, and a polyisocyanurate polymer.

In the present process, the approximately simultaneous polymerization reactions severally produce polymers that are intermingled at the molecular level thereby resulting in the polymer alloy. It is believed, based upon the present understanding of the invention that the polyamide polymer and the polyurethane polymer, the polyurea polymer or the polyisocyanurate polymer are formed independently of each other by different mechanisms, whereby the formation of covalent bonds between the polyamide polymer systems, on the one hand, and the polyurethane polymer, the polyurea polymer and/or the polyisocyanurate polymer systems is absent or substantially absent. However it is quite possible that occasional grafts between the polyamide polymer and one or more of the other polymers may occur.

For example, if two reaction streams contain only polyamide polymer forming compounds and polyurethane polymer forming compounds then a suitable combination of components for one stream comprises the polyurethane catalyst, the anionic polymerization catalyst, the polyol and the lactam. The other stream contains the activator and the isocyanate. However, if the combined streams contain only polyamide polymer forming compounds and polyisocyanurate polymer forming compounds and at the same time the polyisocyanurate polymer forming compounds are directed to a one step polyisocyanurate formation, then the aforedescribed subdivision of components can be used except that the polyurethane catalyst and trimerization catalyst are used in combination.

There are several means for introducing the polyisocyanate component(s) into the mold. In the immediately preceding exemplary streams, possible undesired reactions could occur if the polyisocyanate and the polyol were combined in one stream. Advantageously, the polyisocyanate is introduced into the mold as a separate reactant stream or a mixture of the polyisocyanate and activator is introduced (injected) into one of the other reactant streams shortly before the mixing thereof with the other reactant stream(s) to prepare the polymer alloy reaction mixture.

Reactant streams (otherwise known as reactant mixtures or reactant flows) which contain the polyamide-polymer-forming compounds and polyisocyanurate-polymer-forming compounds, wherein the polyisocyanurate-polymer-forming compounds are directed to the two-step process or prepolymer process then one stream comprises the trimerization catalyst, the anionic polymerization catalyst and a lactam. The other stream contains the anionic polymerization activator and the prepolymer containing isocyanate groups.

As indicated hereinabove with respect to the one-step polyisocyanurate process, it is also possible to use both a urethane polymerization catalyst and a trimerization catalyst. These catalysts are preferably both contained in the same reaction stream(s). It is then necessary to include a polyol in the system, and optionally a second polyisocyanate. The polyol can advantageously be incorporated in the same stream as the urethane polymerization catalyst whereas for the polyisocyanate the same consideration apply as hereinabove.

Advantageously, the amount of catalyst is minimized. Surprisingly, using minimal quantities of catalyst in combination with vacuum degasification techniques the reaction mixture will have substantially no entrained gases. By controlling this reaction mixture, polymer alloys having differing physical properties are obtainable. High impact strength polymer alloys are readily obtained from reaction mixtures substantially free of entrapped gases. The polymer alloys formed from such mixtures have increased impact strengths and/or high flexural moduli.

The situation is approximately the same if instead of polyurethane polymer forming compounds, the streams (and thus the polymer alloy reaction mixture) contain polyurea polymer forming compounds. The polyamine used therein replaces the polyol. If a mixture of both polyol and polyamine is substituted for the polyol or polyamine then a polymer alloy is obtained containing both a polyurethane polymer and a polyurea polymer provided that a suitable catalyst system is used if necessary.

The temperature at which the reactant streams are kept prior to mixing with each other is not critical. Preferably, the temperature should be above the melting point of the lactam (70°–72° C.) since the lactam is employed as the solvent for the other reactants. Nonetheless, the temperature is maintained to avoid reactant degradation or reactant volatility at atmospheric pressure. For example, if a caprolactam solvent is employed, a suitable temperature range is from about 80° C. to about 100° C.

Advantageously the various reactant streams have approximately the same temperature prior to mixing. This avoids undesired adverse effects on the polymer alloy properties due to the mixing of colder and warmer streams. Unlike polyurethane RIM this requires that the lines through which the reactant streams flow to the mixing device and the mold are at least insulated or, more advantageously, controllably heated by steam or electricity.

Advantageously following preparation of the reaction mixture, the process is conducted at a temperature ranging from 30° C. to 180° C., advantageously from about 75°–160° C., more advantageously from about 75°–140° C. and even more advantageously from 85°–95° C.

The reactant streams are advantageously admixed at a temperature ranging from about 30° C. to about 180° C., advantageously from about 80° C. to about 170° C., more advantageously from about 80° C. to about 120° C., and even more advantageously from 85° C. to 95° C.

The specific solvent is selected based on the required end product. It is of course necessary that the solvent react with the other components to yield the polymer alloy product because one feature of the invention is in the absence of substantial further processing steps. For example, when a reinforced rubber is prepared it is not necessary to employ the lactam as the only solvent. It is also possible to have reactant streams using different reactive solvents such as liquid polyols, or even to use these polyols as the only solvent. It is also possible to use specific prepolymers used in the process of the invention as solvent. Inert non-reactive solvents are disadvantageous and result in decreased physical property characteristics of the polymer alloys.

After mixing all the reactant streams, the reaction mixture thus formed is introduced into a heated mold. Advantageously, the reactant streams are metered into a mixing chamber or mixing head and quickly and vigorously admixed to form the polymer alloy reaction mixture. The admixing is done under turbulent conditions. Advantageously, the mixing is done by countercurrently introducing the reactant streams into a suitable mixing chamber. More advantageously in a preferred embodiment, the mixing is obtained in a high velocity reaction injection mixing and dispensing apparatus. The heated mold is kept at a temperature favoring a rapid polymerization rate. Since the polyurethane reaction readily occurs at room temperature, the mold temperature is mainly governed by the lactam polymerization. Advantageously the temperature of the mold is above the melting point of the lactam solutions, but below the melting point of the resulting product. The mold is generally heated to a temperature from above 100° C. The temperature advantageously ranges from about 120° C. to about 175° C.

The mold can be maintained at the desired temperature using different techniques. The mold may be heated in an oven (oven heated molds). Thick mold walls insure that fluctuations in oven temperature do not result in fluctuating temperatures of the mold and its contents. Alternatively, the industrial oil-heated molds can be employed. Preferably, the oil-heated mold is employed because the temperature variations are less and, more importantly, because of its higher heat capacity than an oven or convection system. This is attributable to more effective heat transfer. Consistent even heating of the mold and the contents thereof during the molding process results in products having improved (increased) physical properties.

The residence time in the mold depends on the reaction rate of the various components and the desired polymer alloy properties. In the present process, the residence time may range from as little as 10 seconds upwards to 60 minutes. Depending on the size of the mold and the components used it is even possible to exceed the residence time of 60 minutes. For example if a very large mold is used and if the final product should be free of all then a longer residence time is used. In the reaction injection molding embodiment, the residence time is usually much shorter and typically ranges from about 10 seconds to 10 minutes. More particularly, in the reaction injection molding embodiment, residence times of up to 2 or 3 minutes are obtainable and residence times of less than one-minute are preferred.

The pressure required for introducing the reaction mixture solution into the mold is not critical. Advantageously, in the present process the pressure may range from 1 bar to about 30 bar and still more advantageously from about 1 bar to about 10 bar. One of the major advantages of the present process is the low viscosity of the components, compared to thermoplastic polymers, thereby allowing low injection pressures, in the RIM embodiment, to be used.

In the present process, the components in the reaction streams should be selected to obtain balanced polymerization rates for the polymers formed within the mold. The balanced rates mean that the polymerization for each of the polymers occurs at essentially the same rate; thus a substantially uniform reaction rate advantageously occurs throughout the mold. Advantageously, this results in a stronger polymer alloy product.

It is also necessary to take into account the various interactions which can occur between the components present in the system. It is especially important to make sure that the various catalysts do not inactivate each other.

A broad range of volume ratios of the various reactant streams can be used. An important factor which governs the volume ratio is the efficiency of the mixing. Preferably the volume ratio between the various streams does not exceed 4, more particularly the ratio does not exceed 2, most advantageously the ratio is about 1. The ratio is easily controlled by controlling the amount of lactam monomer. Controlling the amounts of the polymer forming compounds in the reactant streams governs the relative weight % of the polymers in the polymer alloy.

There are various factors governing the weight ratios and wt.% ranges for the polymer components of the present invention. The weight ratio of the polyamide polymer forming compounds on the one hand and the polyurethane polymer forming compounds, polyurea polymer forming compounds and/or the polyisocyanurate polymer forming compounds on the other hand, and consequently the polyamide/polyurethane/polyurea/polyisocyanurate weight ratio in the final product depends on the properties which are to be obtained. The properties relate to desired end uses of the product of the present processes, such as, for instance, high-impact strength structures such as automobile body panels. A polyamide polymer is always present in the present polymer alloy. Consequently, the choice among the polyisocyanurate polymers, polyurea polymers and polyurethane polymers and the weight percent employed is determined by the various characteristics of these polymers and the end-use application of the novel polymer alloy. The wt.% of the respective polymer forming compounds essentially corresponds to the amount of the respective polymer in the polymer alloy.

The present invention provides means whereby products having a wide range of advantageous properties can be obtained as will be readily apparent from the Examples.

The weight percent of the rubber component in the resulting polymer alloy ranges from about 5 wt.% to about 35 wt.%, more advantageously from about 5 wt.% to about 25 wt.%, and most advantageously from 20 wt.% to 25 wt.%.

Ingredients added in the present processes for forming the polymer alloy may include the additives conventionally incorporated in either nylon block copolymers and/or polyurethane components. Such additives include plasticizers, fillers and reinforcing agents such as glass fibers, dyes, pigments, stabilizers, antioxidants, foaming agents, internal mold release agents and the like. These fillers and reinforcing agents may be present in amounts of up to about 50 wt % of the product. More particularly, the additives are added in amounts ranging about 1 wt. % to about 30 wt. %. The properties required in the final polymer alloy product will essentially dictate the amount of additives introduced into the reaction mixture.

Suitable fillers and reinforcing agents comprise milled or chopped glass fibers such as the milled 1/16", or the chopped ⅛" silane treated glass fibers, but also products like wollastonite, flaked mica and the like. Advantageously a combination of a fiber and a non-fiber product such as a combination of 1/16" milled silane treated glass fiber and mica or wollastonite is employed, in a ratio between about 30 parts by weight to about 70 parts by weight and about 70 to about 30 parts by weight. An important advantage of such a combination is enhancement of isotropic properties. This means that unlike with glass fibers alone, the properties of the final object are independent of the direction in which they are measured.

Th use of glass-fiber results in decreased thermal expansion, decreased mold-shrink, and an increase of flexural modulus. A negative aspect, however, is that the impact strength decreases. Thus, the amount of glass fibers that can be introduced into the product has an upper limit. The limit is determined by the fact that the dispersion of glass-fibers in lactam must be pumped into a mold. With 1/16" milled glass-fibers this upper limit is about 25 wt. % whereas only about 5 wt. % of the chopped ⅛" glass fibers can be used.

The presence of conventional additives in all reactant streams is not required. For example, a pigment or an antioxidant may be present only in one stream. The very efficient mixing which occurs in the reaction injection molding process embodiment will ensure that any additive(s) is (are) distributed substantially homogeneously throughout the final product. However, in the hereinafter disclosed preferred embodiment, the quantity of fibers is divided amongst the reaction streams to obtain a high proportion of glass fibers in the final product.

A preferred process embodiment is a reaction injection molding process for preparing the novel polymer alloys. Reaction injection molding (RIM) is a one shot injection method of liquid components usually by impingement into a mold wherein rapid polymerization occurs resulting in a molded polymer product.

In a conventional RIM process at least two substantially stable reactant streams, each containing a portion of the components required to obtain the polymer alloy product, are mixed in a suitable mixing device (such as a mixing head or high speed mixer), whereafter the resulting mixture is rapidly injected into the mold. Injection necessarily results in rapid and turbulent introduction of the reaction mixture into the mold. The resulting mixture contains at least those components necessary for polymerizing the respective polymers. The mold is kept at a temperature sufficiently high to effect the formation of the polymers. After the mixture of the reactant streams is introduced in the mold, rapid polymerization of the reactive polymer forming compounds occurs therein to yield the polymer alloy.

It is essential that the individual reactant streams are substantially stable prior to mixing in order to avoid premature polymerizations and the possibility of undesirable side reactions. Accordingly, the various polymer forming compounds are divided into at least the two reactant streams; each stream does not contain all of the respective polymer forming compounds. This means that advantageously substantially no polymerization occurs prior to the mixing of the streams and the subsequent rapid introduction of the mixture into the mold.

In accordance with another embodiment of the present invention, the polymer alloy is prepared by a casting, i.e. pouring, technique. The reaction flows are mixed in a mixing vessel to form the reaction mixture. The reaction mixture is subsequently introduced, by pouring, into the mold. The mold is maintained at conditions favoring rapid polymerization. After the molding is completed, the then casted object formed from the polymer alloy is de-molded. The casted polymer alloy may have a polymeric constituency in accordance with the description of the process embodiments.

| TABLE OF MATERIALS | | |
|---|---|---|
| Designation | Composition | Specification |
| CLM | ε-Caprolactam | Anionic, polymerization grade, water content below 100 ppm. |
| Dabco TMR | N—hydroxy propyl trimethyl ammonium 2-ethylhexanoate | |
| Desmodur L-2291A | 1,3,5-tri (isocyanatohexamethylene) | eg. wt. 182 |
| Desmodur W | methylene bis(4-cyclohexylisocyanate) | eq. wt. 131 |

-continued
TABLE OF MATERIALS

| Designation | Composition | Specification |
|---|---|---|
| HDI | 1,6 Hexamethylene diisocyanate | eq. wt. 84.1 |
| Jeffamine D-2000 | Amine terminated polyether resin | eq. wt. 1000 |
| Isonate 143L | Carbodiimide-modified MDI | eq. wt. 144 |
| Isonate 191 | Modified MDI | eq. 138.9 |
| KL | Potassium lactamate | 2 eq./Kg in CLM |
| LMB | Lactam magnesium bromide | 1 eq/kg in CLM |
| NaL | Sodium lactamate | 1.4 eq/kg in CLM |
| Niax A-1 | | |
| Niax 31-28 | Polyacrylonitrile grafted polyether polyol | Eq. Wt. 2000 |
| Niax 34-28 | | |
| Niax G56 | Poly(oxypropylene)triol | eq. wt. 2244 |
| Pluracol 380 | capped with ethylene oxide | |
| Polycat 41 | | |
| Pluracol P-2010 | Poly(oxypropylene)glycol | Eq. wt. 1002 |
| Pluracol P-4010 | Poly(oxypropylene)glycol | Eq. Wt. 2000 |
| Polacure 740 M | | |
| Teracol 2900 | Poly(oxytetramethylene) glycol | Eq. Wt. 1450 |
| Teracol 2000 | Poly(oxytetramethylene) glycol | Eq. Wt. 1024 |
| T-9 | Stannous octoate | |
| T-12 | Dibutyltin dilaurate | |

Exemplary Process Reactant Streams Containing Polymer Forming Compounds

The various polymer alloys of the present invention can be prepared using, for example, a two-stream reaction-injection molding apparatus. Exemplary individual polymer forming compounds are (1) a caprolactam blocked activator, (2) a catalyst for the polyamide, (3) an isocyanate terminated prepolymer, (4) a polyisocyanate, (5) a polyamine, (6) a polyol, (7) a polyurethane catalyst, (8) a polyisocyanurate catalyst and (9) a lactam (e.g. $\epsilon$-caprolactam). These numbered components, i.e., the polymer forming compounds, are divided between a Stream A and a Stream B, and mixed to obtain a reaction mixture. The mixture is then rapidly introduced into the mold. The polymer alloy forms in the mold.

TABLE A
The Polymer Alloys of the Present Invention Prepared Using a Two Stream Reaction Injection Molding Apparatus

| Polymer Alloy | Stream A | Stream B |
|---|---|---|
| polyamide/polyisocyanurate | 2,9 | 1,3 |
| polyamide/polyurethane | 2,6,7,9 | 1,4 |
| polyamide/polyurea | 2,5,9 | 1,4 |
| polyamide,polyisocyanurate polyurethane | 2,6,7,9 | 1,3,4 |
| polyamide,polyisocyanurate polyurea | 2,5,9 | 1,3,4 |
| polyamide,polyurethane polyurea | 2,5,6,7,9 | 1,3,4 |
| polyamide,polyurethane, polysiocyanurate,polyurea | 2,5,6,7,9 | 1,3,4 |

Note: In the above tabulation, the numbers identify the components as numerically identified in the preceeding paragraph.

In the above exemplary streams, the relative amounts of the various polymer forming compounds are important. For example, in preparing a polymer alloy composed of a polyamide polymer(s), a polyisocyanurate polymer, and a polyurea polymer the amount of the isocyanate component in Stream B must be greater than the amount of polyamine in Stream A otherwise a polyamide-polyurea polymer alloy is obtained.

Exemplary specific process reactant streams are described as follows. Specified amounts are, of course, exemplary and can be varied.

Exemplary Streams I

| Stream A | |
|---|---|
| $\epsilon$-caprolactam | 50 grams (.442 eq.) |
| LMB catalyst | 10 grams |
| Niax 34-28 | 6.0 grams (0.0031 eq.) |
| T-9 (Stannous octoate) | 2 drops |
| Stream B | |
| Isonate 143 L | 0.45 g to 0.87 g |
| Adduct of HDI/P-380/ $\epsilon$-caprolactam | 5.0 grams |

Exemplary Streams II

| Stream A | |
|---|---|
| $\epsilon$-caprolactam | 50.0 grams (0.442 eq.) |
| LMB catalyst | 10.0 grams |
| Niax G 56 | 6.0 (0.006 eq.) |
| T-9 (stannous octoate) | 2.0 drops |
| Stream B | |
| Isonate 143L | 0.45–0.87 grams (0.006 eq.) |
| Adduct of HDI/P-380/ $\epsilon$-caprolactam | 5.0 grams |

Exemplary Streams III

| Stream A (mixed and heated to 120° C.) | |
|---|---|
| $\epsilon$-caprolactam | 50.0 grams |
| LMB Catalyst | 10.0 grams |
| Polycat 41 | 1.0 grams |
| Stream B | |
| P-1010 Pre-polymer (NCO % - 5.05) | 10 grams |
| Adduct of HDI/P-380/ $\epsilon$-caprolactam | 25.0 grams |

Streams A and Stream B are then mixed and heated to 135° C.

Exemplary Streams IV

| Stream A (mixed and heated to 120° C.) | |
|---|---|
| $\epsilon$-caprolactam | 50.0 grams |
| potassium lactamate | 20.0 grams |
| Stream B | |
| Prepolymer based on P-1010 or P-2010 | 10.0 grams |
| adduct of HDI/P-380/$\epsilon$-caprolactam | 25.0 grams |

Stream A and Stream B were mixed and heated at 135° C. Molding time is total of the elapsed injection time, reaction time, solidification time plus de-molding time.

A suitable prepolymer for use in the above-exemplary stream compositions, is obtained by admixing HDI, MDI or carbodiimide-modified MDI and a demoisturized polyoxypropylene glycol (equivalent wt. 525) at a 2:1 molar ratio at 75° C. until the NCO% reached 5.05%.

Preparation of polymer alloys of polyamide polymers and polyisocyanurate polymers are obtainable in accord with the following exemplary formulation.

Exemplary Streams V

| Nylon Stream | |
|---|---|
| Caprolactam, | |
| Caprolactam adduct of P-380/1,6 hexamethylene diisocyanate prepolymer (NCO/OH ratio of 3/1), | |

-continued

| Exemplary Streams V |
|---|
| potassium lactamate |
| Isocyanurate Stream |
| Isocyanate-terminated prepolymer of a polyoxypropylene glycol (eg. wt. 1002) and a carbodiimide modified MDI (Isonate 143L). |

In the above-exemplary formulations for a two stream process no additional trimerization catalyst is required. The potassium lactamate catalyses the trimerization. The caprolactam capped adduct of the P-380/hexamethylene diisocyanate prepolymer acts as the crosslinking agent for the nylon. Typical molding temperatures range from 140° C. to 160° C.

A three stream process is also suitable for preparing certain polymer alloys of the present invention. Advantageously, the three stream process is useful in preparing polymer alloys composed of three or more different polymers. An exemplary three stream process comprises Stream A as previously described in Table A for the two stream system, Stream B[1] comprising, for instance, the caprolactam blocked activator and the isocyanate-terminated prepolymer, and Stream C comprising, for instance, the polyisocyanate.

These same above-considerations also apply to preparing the four-polymer-based polymer alloy.

It should be understood that other apparatus can be used. For instance in a reaction injection molding a mixing head for mixing and dispensing two or more liquid components is suitable. In such a device, the mixing head has a housing defining the mixing chamber with two or more inlets for the separate components and an outlet for dispensing the component mixture from the chamber.

The disclosures of Schneider, New Developments in RIM Equipment (ACS 1985); U.S. Pat. No. 4,332,335, U.S. Pat. No. 4,239,732 U.S. Pat. No. 3,975,128, and U.S. Pat. No. 3,706,515 are incorporated herein by reference.

The disclosure of EPO application No. 158,394 is incorporated herein by reference.

A polymer alloy of all four of the polymers can be obtained with a reaction mixture containing all of the required respective polymer forming components and, if desired, a trimerization catalyst.

EXAMPLES 1-3 AND COMPARATIVE EXAMPLES A-C (Polyurethane and polyamide alloys)

5 g of a carbamoyl-lactam activator and 2 g of Pluracol 220 (primary hydroxyl groups containing polyether triol with equivalent weight of 2078) were dissolved in 25 g of anhydrous caprolactam at 90° C. The activator was prepared by first reacting HDI and Pluracol 380, a primary hydroxyl groups containing polyethertriol with equivalent weight of 2244 in a molar ratio of 3 to 1. The resulting isocyanate terminated polyurethane was reacted with caprolactam to yield a trifunctional activator.

10 meq of lactam magnesium bromide dissolved in caprolactam (10 g combined weight) and two drops of T-9 (Sn II octoate) were dissolved in a second portion of 25 grams of anhydrous caprolactam at 90° C. The total amount of caprolactam in the two flows (streams) amounted to 57.9 grams.

The two caprolactam solutions and 0.42 g of Isonate 143 L (liquid carbodiimide modified MDI) were mixed at 120° C. The resulting mixture was introduced into a mold which was kept at 130° C. The product recovered from the mold possessed the mechanical properties given in Table 1.

Two other experiments were performed as described above wherein the total amount of rubber phase (polyether plus polyurethane) was increased by increasing the amounts of polyurethane. The properties thereof are also given in Table I.

For comparison, three nylon block copolymers were prepared using only the polyamide forming components, without the polyurethane forming compounds. The amounts of rubber phase (only polyether) in these copolymers are somewhat higher than those contained in the products of Examples 1-3. The results are presented in Table II.

A comparison of Table I and Table II clearly shows that the invention provides for markedly superior products even at relatively low levels of rubber phase.

TABLE 1

| | | Before Water Absorption | | After Water Absorption (for one week) | | | | |
|---|---|---|---|---|---|---|---|---|
| Ex. | Rubber Phase wt. % | Tensile Strength (kpsi/MPa) | Elongation (%) | Tensile Strength (kpsi/MPa) | 100% (kpsi/MPa) | Elongation (%) | Tear Strength (pli/kN/m) | Izod (J/m) |
| 1 | 9.5 | 9.81 | 36.7 | 4.9 | 4.5 | 220 | 880 | 211 |
| | | 67.6 | | 33.8 | 30.6 | | 154 | |
| 2 | 13.2 | 9.61 | 30.0 | 4.7 | 3.85 | 230 | 801 | 250 |
| | | 66.3 | | 32.4 | 26.20 | | 140 | |
| 3 | 15.5 | 7.15 | 98 | 4.7 | 3.57 | 338 | 853 | 400 |
| | | 49.3 | | 32.4 | 24.30 | | 149 | |

TABLE 2

| | | Before Water Absorption | | | After Water Absorption (for one week) | | | |
|---|---|---|---|---|---|---|---|---|
| Ex. | Rubber Phase wt. % | T.S.* kpsi/MPa | 100% Modulus kpsi/MPa | % Elongation | T.S.* kpsi/MPa | 100% Modulus kpsi/MPa | % Elongation | Tear Strength pli/kN/m |
| A | 44.1 | 1.6 | 0.8 | 321 | 1.5 | 1.0 | 433 | 585 |
| | | 11.0 | 5.7 | | 10.3 | 7.2 | | 102.0 |
| B | 29.4 | 1.5 | 1.4 | 120 | 1.3 | — | 76 | 459 |
| | | 10.3 | 9.9 | | 8.6 | | | 80 |
| C | 14.8 | 5.3 | — | 33 | 3.0 | — | 84 | 131 |

TABLE 2-continued

| | | Before Water Absorption | | | After Water Absorption (for one week) | | | |
|---|---|---|---|---|---|---|---|---|
| Ex. | Rubber Phase wt. % | T.S.* kpsi/MPa | 100% Modulus kpsi/MPa | % Elongation | T.S.* kpsi/MPa | 100% Modulus kpsi/MPa | % Elongation | Tear Strength pli/kN/m |
| | | 36.8 | | | 21.0 | | | 23 |

*Tensile strength.

EXAMPLES 4-6

(polyurethane and polyamide alloys)

In the same manner as Example 1, mixtures were prepared using different amounts of components.

The adducts used in Examples 4, 5 and 6 were, respectively, Desmodur L 2291 A (Bayer) capped with a stoichiometric amount of caprolactam; a polyoxypropylene triol having an eq. wt. of 2244 (P-380 from BASF Wyandot) reacted with Desmodur W (NCO-/OH=3/1) and the resulting isocyanate terminated prepolymer capped with a stoichiometric amount of caprolactam; and acyllactam prepared by reacting one equivalent of polyoxypropylene glycol (molecular weight of approximately 4000) with two equivalents of terephthaloyl dichloride and thereafter blocking that product with a stoichiometric amount of caprolactam.

The polyamide catalyst used was lactam magnesium bromide dissolved in caprolactam (1 eq/kg).

The urethane catalyst was T-9 (Sn II-octoate).

In Table III the compositions, conditions and solidification times are given.

TABLE III

| | | Example No. | | |
|---|---|---|---|---|
| | | 4 | 5 | 6 |
| polyether | wt. % | 20.0 | 26.8 | 27.7 |
| caprolactam | grams | 20.0 | 20.0 | 20.0 |
| polyamide catalyst | grams | 16.2 | 16.2 | 5.9 |
| urethane catalyst | grams | 0.12 | 0.12 | 0.12 |
| adduct: | | | | |
| Desmodur L 2291A/CLM* | grams | 2.4 | — | — |
| P. 380/Desmodur W/CLM | grams | — | 11.6 | — |
| acyllactam | grams | — | — | 3.2 |
| polyisocyanate: | | | | |
| Isonate 143 L | grams | 1.52 | — | 1.14 |
| P 2010**/Isonate 143L prepolymer (NCO/OH = 2/1) | grams | — | 13.5 | — |
| P 2010 polyol | grams | 10 | 10 | 7.6 |
| mixing temperature, | °C. | 95 | 95 | 95 |
| polymerization temperature, | °C. | 140 | 140 | 140 |
| solidification time, | min. | 43 | 70 | 60 |

*CLM designates caprolactam.
**P-2010 is a polyoxypropylene glycol with a molecular weight of approximately 2000.

EXAMPLES 7-9

With different compounds, namely potassium lactamate (KL), sodium lactamate (NaL) and lactam magnesiumbromide (LMB), the catalytic effect on polyisocyanate trimerization was determined.

In Examples 7, 8 and 9, the following procedure was employed. A test containing a polyisocyanate was heated in an oil bath at 95° C. A second test tube containing the catalyst was also similarly heated at 95° C. The catalyst was poured into the test tube containing the polyisocyanate. After mixing the catalyst and polyisocyanate, the latter test tube containing the catalyst-polyisocyanate mixture was then immersed in an oil bath maintained at 140° C.

The solidification times observed are shown in Table IV. The times were determined in minutes. I.R. measurements of the samples showed the isocyanurate groups formed.

TABLE IV

| | | Example No. | | |
|---|---|---|---|---|
| | | 7 | 8 | 9 |
| polyisocyanurate | | | | |
| P 2010/Isonate 143 L prepolymer (1/2) | grams | 25 | 25 | — |
| Isonate 143 L | grams | — | — | 25 |
| catalyst* | | (KL) | (NaL) | (LMB) |
| concentration | eq/kg | 2.0 | 1.3 | 1.0 |
| weight | grams | 4.0 | 7.2 | 6.0 |
| mixing temperature | °C. | 95 | 95 | 95 |
| polymerization temperature | °C. | 140 | 140 | 140 |
| solidification time | min. | 0.50 | 13.75 | 4.5 |

*catalysts are solutions in caprolactam

EXAMPLE 10

(polyamide and polyisocyanurate alloy)

In the same way as described for Examples 1-3, two solutions, 'A' and 'B', in caprolactam were prepared respectively having the compositions presented in Table V.

In solution A and solution B, "x" designates an activator prepared by reacting a polypropylene-oxide triol and hexamethylene diisocyanate, carbamoyl biscaprolactam using a sodium lactamate catalyst. "xx" indicates the component is a mixture containing caprolactam. The amount of caprolactam in the aggregate mixture of solutions A and B was 34.7 grams.

TABLE V

| Solution A |
|---|
| 8.3 g activator$^{x,xx}$ |
| 3 g Pluracol TPE 4542 (polyethertriol, e.g. wt 1567) |
| 16 g caprolactam |
| Solution B |
| 21.1 g potassium lactamate$^{xx}$ |
| 16 g caprolactam |
| 2 drops of T-12 (dibutyltin dilaurate) |

Solutions A and B were mixed together with 0.3 grams Isonate 143 L at 90° C. The resulting mixture was introduced into a mold at 130° C. The mixture became viscous after 5 seconds, reached its cloud point after 80 seconds and was completely co-polymerized after 6 minutes, 15 seconds.

EXAMPLE 11

(polyamide and polyisocyanurate alloy)

A mixture was prepared using the process described in Example 10 with the exception that 0.16 grams of hexamethylene diisocyanate (HDI) was used instead of Isonate 143 L. The mixture became viscous after 5 seconds, reached its cloud point after 55 seconds and was completely polymerized after 120 seconds.

A comparison of Examples 10 and 11 clearly shows that the use of HDI as the polyisocyanate in the polyurethane forming compounds is to be preferred.

EXAMPLE 12

0.16 grams of hexane diisocyanate was added to a test tube containing 3 grams of Pluracol TPE 4542 (polyether triol, eq. wt. 1567), 32 grams of caprolactam and 2 drops of T-12(di-butyltin di-laurate) catalyst. The test tube mixture was 90° C. prior to the hexane diisocyanate addition. After immersing the test tube in an oil bath at 130° C. for 5 minutes, the reaction mixture was still clear (no cloud point).

Thereafter, 2.1 grams of potassium lactamate in caprolactam was added. No polymerization was observed within 15 minutes.

This confirms that the 1,6-hexane diisocyanate does not react with the caprolactam to give a caprolactam capped hexane diisocyanate activator, at least not under these reaction conditions.

EXAMPLE 13

(Polyamide and polyisocyanurate alloy)

26 grams potassium lactamate (2 molar in caprolactam) was dissolved in 87 grams anhydrous caprolactam at 95° C. to form component A.

Separately, 7.67 grams of an adduct together with 41.9 grams of an isocyanate-terminated prepolymer were heated at 95° C. to form component B. The adduct was obtained by reacting Desmodur L 2291A with a stoichiometric amount of caprolactam. The isocyanate-terminated prepolymer was obtained from one equivalent of a polyoxypropylene glycol having a molecular weight of approximately 2000 (Pluracol P-2010; equivalent wt. of 1002) and two equivalents of a carbodiimide modified MDI (Isonate 143 L). The adduct is the activator for the polyamide and the isocyanate terminated prepolymer is the polyisocyanate forming compound.

Components A and B were mixed. Then the mixture was poured into a mold at 140° C. After 15 minutes the cast-molded product was demolded. The cast product was composed of a polyamide-polyisocyanurate alloy. The physical properties of the polymer alloy product are shown in Table VI.

EXAMPLES 14–21

(polyamide and polyisocyanaurate alloys)

Various mixtures were prepared in the same manner as Example 13, except different amounts of components were used. Various polymer alloys composed of polyamide and polyisocyanurate polymers were prepared.

The compositions, conditions and properties of the products obtained are reported in Table VI.

Acyl lactam is obtained by reacting one equivalent of polyoxypropylene glycol (with a molecular weight of approximately 4000) with two equivalents of terephthaloyl dichloride and thereafter blocking the prepolymer with a stoichiometic amount of caprolactam.

Table VI reports the data for Examples 13—21. In table VI, the abbreviations are otherwise explained in the TABLE OF MATERIALS, presented elsewhere hereinabove.

TABLE VI

| | | 13 | 14 | 15 | 16 | 17 | 18 | 19 | 20 | 21 |
|---|---|---|---|---|---|---|---|---|---|---|
| Polyether | wt. % | 20 | 20 | 27 | 30 | 20 | 23.7 | 25 | 20 | 20 |
| Caprolactam | g | 87 | 93.5 | 87 | 87 | 100 | 100 | 87 | 100 | 64.4 |
| catalyst | eq/kg | 2 | 2 | 2 | 2 | 2 | 2 | 2 | 1 | 1 |
| potassiumlactamate | g | 26 | 19.5 | 26 | 26 | 13 | 13 | 26 | — | — |
| lactam MgBr | g | — | — | — | — | — | — | — | 29.4 | 52 |
| Adduct: | | | | | | | | | | |
| Desmodur L 2291 A + CLM* | g | 7.67 | 7.67 | 7.67 | 7.67 | — | — | 7.7 | — | 7.67 |
| Acyl lactam | g | — | — | — | — | — | — | — | 16.2 | — |
| P 380/HDI/CLM* | g | — | — | — | — | 7.0 | 28.0 | — | — | — |
| Prepolymer | | | | | | | | | | |
| P 2010/Isonate 143 L | g | 41.9 | 41.9 | 64.4 | 76.1 | 31.7 | 19.2 | — | 26.8 | 43.1 |
| Teracol 2000/ Isonate 143 L | g | — | — | — | — | — | — | 56.9 | — | — |
| Total caprolactam | g | 114 | 114 | 114 | 114 | 110 | 111 | 114 | 127 | 114 |
| Eq ratio Cat/caprolactam | % | 5.6 | 4.1 | 5.6 | 5.6 | 2.7 | 2.7 | 5.6 | 2.7 | 5.6 |
| Eq ratio Adduct/caprolactam | % | 2.8 | 2.8 | 2.8 | 2.8 | 0.53 | 2.1 | 2.8 | 0.34 | 2.8 |
| Mixing temperature | °C. | 95 | 95 | 95 | 95 | 95 | 95 | 95 | 95 | 95 |
| Molding temperature | °C. | 140 | 140 | 140 | 140 | 160 | 140 | 140 | 140 | 140 |
| Molding time | min. | 15 | 15 | 15 | 15 | 15 | 15 | 15 | 40 | 60 |
| Solidification time | min. | 2'15" | 3'20" | 3'20" | 4'00" | 2'00" | 3'00" | 2'30" | 27'30" | 34'05" |
| Flexural modulus | MPa | 1212 | 1340 | 870 | 615 | 631 | 981 | 1329 | 583 | 995 |
| Notched Izod Impact | J/m | 128 | 205 | 325 | 437 | 216 | 200 | 187 | 410 | 411 |

*CLM = caprolactam

EXAMPLE 22

(Polyamide and polyisocyanurate alloy)

26 grams potassiumlactamate (2 molar in caprolactam), 32.5 grams P 2010 (polyoxypropylene glycol with a molecular weight of approximately 2000), 0.046 gr. T-9 catalyst and 0.046 gr. Dabco TMR (trimerization catalyst) were dissolved in 87 grams of anhydrous ε-caprolactam at 95° C. to form Component A.

7.67 grams of an adduct, Desmodur L 2291 A, and a stoichiometric amount of ε-caprolactam together with 9.39 grams of Isonate 143 L were heated up to 95° C. to form component B.

Components A and B were then mixed. The mixture was poured into a mold maintained at 140° C. A polymer alloy product was formed in the mold. The polymer alloy product sample was demolded. After 15 minutes the physical properties of the polymer alloy product are shown in Table VII.

EXAMPLE 23

(polyamide and polyisocyanurate alloy)

A polymer alloy was made in the same way as described in Example 21 with the following exceptions. An acyllactam was used instead of the Desmodur L 2291 A adduct. The acyllactam was the reaction product of one equivalent of a polyoxypropylene glycol having a molecular weight of 4000, and two equivalents terephthaloylchloride, thereafter blocked with a stoichiometric amount of ε-caprolactam. Lactam magnesiumbromide (1 molar in caprolactam) was used instead of the potassium lactamate catalyst. The physical properties of the polymer alloy formed are shown in Table VII.

TABLE VII

|  |  | Example No. | |
| --- | --- | --- | --- |
|  |  | 22 | 23 |
| polyether | wt. % | 20 | 20 |
| P-2010 | g | 32.5 | 20.8 |
| caprolactam | g | 87 | 100 |
| catalyst: |  |  |  |
| KL | g | 26 | — |
| lactam MgBr | g | — | 29.4 |
| T-9 | g | 0.046 | 0.023 |
| Dabco TMR | g | 0.046 | 0.023 |
| Adduct: |  |  |  |
| Desmodur L 2291 A + CLM* | g | 7.67 | — |
| Acyllactam | g | — | 16.2 |
| Isonate 143 L | g | 9.39 | 6.0 |
| Total caprolactam | g | 114 | 127 |
| eq ratio NCO/OH |  | 2.0 | 2.0 |
| eq ratio Cat/CLM | % | 5.6 | 2.7 |
| eq ratio adduct/CLM | % | 2.8 | 0.34 |
| mixing temp.** | °C. | 95 | 95 |
| molding temp | °C. | 140 | 140 |
| molding time | min. | 15 | 40 |
| solidification time | min. | 1'05" | 29'35" |
| Flexural modulus (ASTM D-790) | MPa | 1170 | 925 |
| Notched Izod impact (ASTM D256) | J/m | 88 | 125 |

*CLM = caprolactam
**temperature in raw material storage vessel prior to molding

EXAMPLE 24

(polyurea and polyamide alloy)

16.2 grams of lactam magnesiumbromide (1 molar in caprolactam), 0.5 gram Niax A-1 (70% bis(2-dimethylaminoethyl)ether solution in dipropylene glycol) and 10 grams of Jeffamine D-2000 (amine-terminated polyloxypropylene glycol), equivalent weight of about 1000 were dissolved in 20 grams of anhydrous caprolactam at 95° C. to form component A.

2.4 grams of an adduct together with 1.52 grams Isonate 143 L were heated at 95° C. to form component B. The adduct was obtained by reacting Desmodur L 2291 A with a stoichiometric amount of ε-caprolactam.

Components A and B were mixed together in a test tube and this test tube was immersed in an oil bath at 140° C. The solidification time was 26 minutes.

EXAMPLES 25-27

(polyurea and polyamide alloy)

In the same manner as Example 24, reaction mixtures were prepared using different amounts of components. The adducts used were:

(A) P 380 reacted with Desmodur W (NCO/OH-3/1) and the resulting isocyanate terminated prepolymer capped with a stoichiometric amount of caprolactam and (B) acyllactam prepared by reacting one equivalent of poly(oxypropylene) glycol (MW 4000) with two equivalents of terephthaloyl dichloride and thereafter blocked with a stoichiometric amount of caprolactam. Adduct "(A)" was used in preparing the Example 25 and Example 26 products. The acyllactam adduct, "(B)", was used in preparing the Example 27 product.

The compositions, conditions and solidification times are given in Table VIII.

TABLE VIII

|  |  | Example No. | | |
| --- | --- | --- | --- | --- |
|  |  | 25 | 26 | 27 |
| polyether | wt. % | 32 | 17 | 39 |
| ε-caprolactam | g | 20 | 20 | 20 |
| lactam MgBr | g | 16.2 | 16.2 | 16.2 |
| Polyamine: |  |  |  |  |
| Jeffamine D-2000 | g | 10 | — | 10 |
| Polacure 740 M | g | — | 1.5 | — |
| Niax A-1 | g | 0.6 | 0.6 | 0.7 |
| Adduct: |  |  |  |  |
| P-380/Desmodur W + CLM* | g | 11.6 | 11.6 | — |
| Acyllactam | g | — | — | 18.0 |
| Polyisocyanate: |  |  |  |  |
| Isonate 143 L | g | 1.52 | — | 1.52 |
| P 2010**/ Isonate 143 L prepolymer (NCO/OH-2/1) | g | — | 13.5 | — |
| mixing temperature | °C. | 95 | 95 | 95 |
| polymerization temperature | °C. | 140 | 140 | 140 |
| solidification time | min. | 24'25" | 59' | 9'20 |

*CLM = caprolactam
**P-2010 is a polyoxypropylene glycol having a molecular weight of approximately 2000.

What is claimed is:

1. A process for preparing a polymer alloy comprising:
    (i) introducing into a mold a mixture comprising:
        (a) polyamide forming compounds wherein said polyamide forming compounds include at least one lactam, an anionic polymerization catalyst and a polymerization activator, and
        (b) polymer forming compounds for forming:
            (A) at least one polymer selected from the group consisting of polyurea and polyisocyanurate polymers, or
            (B) polyurethane polymers and at least one additional polymer selected from the group consisting of polyurea polymers, and polyisocyanurate polymers,
    wherein
    said polyurea polymer forming compounds include a polyamine or hydrazine containing compound and a polyisocyanate,
    said polyisocyanurate polymer forming compounds include a prepolymer containing isocyanate groups or a polyol and a polyisocyanate, and a trimerization catalyst,
    said polyurethane polymer forming compounds include a polyol, a polyisocyanate, and an urethane polymerization catalyst,
    said polymer forming compounds reacting to form a polymer alloy comprising:
        (A) polyamide polymers and polyurethane polymers, and at least one of the following polymers: polyurea polymers; and polyisocyanurate polymers; or
(B) polyamide polymers and at least one of the following polymers: polyurea polymers and polyisocyanurate polymers; and
(ii) recovering said polymer alloy from said mold.

2. Process according to claim 1, wherein said mixture comprises polyisocyanurate polymer forming compounds and polyamide polymer forming compounds.

3. Process according to claim 1, wherein said mixture comprises polyurea polymer forming compounds and polyamide polymer forming compounds.

4. Process according to claim 1, wherein said mixture comprises polyurethane polymer forming compounds, polyisocyanurate forming compounds and polyamide forming compounds.

5. Process according to claim 1, wherein said mixture comprises polyurethane polymer forming compounds, polyurea polymer forming compounds and polyamide polymer forming compounds.

6. Process according to claim 1, wherein said mixture comprises polyurea polymer forming compounds, polyisocyanurate polymer forming compounds and polyamide polymer forming compounds.

7. Process according to claim 1, wherein said mixture comprises polyurea polymer forming compounds, polyurethane polymer forming compounds, polyisocyanurate polymer forming compounds and polyamide polymer forming compounds.

8. Process according to claim 1, wherein said polyisocyanurate polymer forming compounds comprise at least one isocyanate-terminated prepolymer and at least one trimerization catalyst.

9. Process according to claim 1, wherein said polyisocyanurate polymer forming compounds comprise at least one polyisocyanate, at least one polyol, and at least one trimerization catalyst.

10. Process according to claim 9, wherein the equivalent ratio of the NCO-groups in the polyisocyanate and the OH-groups in the polyol is from 1.2 to 10.

11. Process according to claim 10, wherein said ratio is between 1.3 and 3.0.

12. Process according to claim 9, wherein the equivalent ratio of the NCO-groups in the polyisocyanate and the OH groups in the polyol ranges from about 1.3 to about 5.0.

13. Process according to claim 1, wherein said trimerization catalyst is selected from the group consisting of alkali metal lactamates, alkali metal carboxylates, hexahydrotriazine derivatives, Zwitter-ion compounds, tertiary alkanolamine compounds, tertiary amines in combination with epoxy compounds, tertiary amines in combination with alkali metal carboxylates and quaternary ammonium carboxylates.

14. Process according to claim 13, wherein said catalyst is an alkali metal lactamate.

15. Process according to claim 8, wherein said isocyanate-terminated prepolymer is the reaction product of a polymer containing active hydrogen groups reactive with an isocyanate group and a polyisocyanate.

16. Process according to claim 1, wherein said anionic lactam polymerization catalyst is an alkali metal compound, a Grignard compound, or a combination thereof.

17. Process according to claim 1, wherein said lactam polymerization activator comprises a lactam blocked isocyanate, or an acyl lactam compound.

18. Process according to claim 17, wherein said activator is a carbamoyl lactam.

19. Process according to claim 18 wherein said carbamoyl lactam is the reaction product of an isocyanate terminated compound with a lactam.

20. Process according to claim 1, wherein said polyurethane polymer forming compounds include at least one polyol selected from the group consisting of polyether polyols, polyester polyol, polybutadiene polyol, grafted polyether polyol, polyurea-dispersion in polyether polyol, polyester polyol, and mixtures thereof.

21. Process according to claim 1, wherein said polyurethane polymer forming compounds include at least one polyisocyanate selected from the group consisting of aromatic, aliphatic, araliphatic and/or cyloaliphatic polyisocyanates and mixtures thereof.

22. Process according to claim 1, wherein said polyurethane catalyst is a tertiary amine, tin carboxylate salt, or a combination thereof.

23. Process according to claim 1, wherein the polyurethane polymer forming compounds include a chain extender selected from the group consisting of aliphatic unbranched or branched diols and triols, low molecular weight polyethylene glycols and cycloaliphatic diols and mixtures thereof.

24. Process according to claim 1, wherein said polyurea forming compounds include at least one polyamine having an equivalent weight of 100 to 3000.

25. Process according to claim 24 wherein said polyamine has an equivalent weight from about 1,000 to about 25,00.

26. Process according to claim 1, wherein said polyisocyanate is selected from the group consisting of 2,4- or 2,6-toluene diisocyanate, 4,4' diphenylmethane diisocyanate, polymethylene polyphenylpolyisocyanates, isophorone diisocyanate, 1,6- and 1,5-hexane diisocyanate, xylylene diisocyanate, carbodiimide modified 4,4' diphenylmethane diisocyanate, hydrogenated 2,4-, 2,6'-toluene diisocyanate, hydrogenated xylylene diisocyanate, hydrogenated 4,4' diphenylmethane diisocyanate, trimers of isophorone diisocyanate, isocyanate-terminated polyether triols, adducts of 2,4- and 2,6-toluene diisocyanate and trimethylolpropane, adducts of 4,4' diphenylmethane diisocyanate and trimethylolpropane, adducts of 1,6- and 1,5-hexane diisocyanate and trimethylolpropane, and combinations thereof.

27. Process according to claim 1, wherein the residence time of said mixture in said mold is between 10 seconds and 60 minutes.

28. Process according to claim 27, wherein said residence time is between 10 seconds and 10 minutes.

29. A reaction injection molded product comprising a polyamide polymer and a polyurethane polymer and at least one of the following polymers:
a polyisocyanurate polymer and a cross-linked polyurea polymer.

30. A product according to claim 29, wherein only one of said polyamide polymer or said polyurethane polymer is cross-linked, linear or branched.

31. A product according to claim 29, wherein both said polyamide and said polyurethane polymer are substantially linear or branched.

32. A reaction injection molded product comprising at least one polyamide polymer and at least one of the following:
polyisocyanurate polymers, and
cross-linked polyurea polymers.

33. A product according to claim 32, wherein said product is an interpenetrating polymer network of said polyamide polymer and:
(A) said polyisocyanurate polymer; (B) said polyurea polymer, or (C) said polyisocyanurate polymer and said polyurea polymer.

34. A molded polymer alloy product obtained by admixing substantially stable reactant streams to obtain an admixture,
(i) introducing said admixture into a mold, said admixture comprising:
(a) polymer forming compounds for forming polyurethane polymer(s) and at least one polymer selected from the group consisting of polyurea polymers and polyisocyanurate polymers,
said polyurethane polymer forming compounds including a polyisocyanate, and a polyurethane polymerization catalyst,
said polyurea polymer forming compounds including a polyamine or hydrazine containing compound and a polyisocyanate,
said polyisocyanurate polymer forming compounds including at least one prepolymer containing reactive isocyanate groups or a polyol and a polyisocyanate, and a trimerization catalyst; and
(b) polyamide polymer forming compounds, said polyamide polymer forming compounds including at least one lactam, an anionic polymerization catalyst and a polymerization activator,
said polymer forming compounds reacting in said mold wherein a molded product composed of the polymers is obtained from the respective polymer forming compounds; and
(ii) recovering said product from said mold.

35. A polymer alloy comprising at least one polyamide polymer and at least one polyurethane polymer and at least one polymer selected from the group consisting of polyisocyanurate polymers and polyurea polymers, wherein
said polyamide is a polymerization product of 4 to 15 carbon ring lactams,
said polyurethane polymer is the reaction product of a polyhydroxy compound having an equivalent weight of 100 to 3000 with an organic polyisocyanate,
said polyisocyanurate polymer is the trimerization reaction product of an isocyanate-terminated urethane prepolymer or the reaction product of the trimerization of a polyol with an excess amount of an organic polyisocyanate in the presence of a urethane catalyst, and a trimerization catalyst,
said polyurea polymer is the in-mold reaction product of an organic polyisocyanate and an amine-terminated poly(oxyalkylene) compound having an equivalent weight of about 1000 to 2000.

36. The process according to claim 1, wherein
in said process at least two reactions streams are prepared,
said first reactant stream comprising caprolactam and an alkali lactamate;
said second reactant stream comprising an isocyanate-terminated prepolymer and lactam adduct;
said first and said second streams are mixed to obtain said mixture; and
said mixture is introduced into the mold.

37. The process according to claim 1, wherein
in said process at least two reaction streams are prepared, admixed, and then introduced into the mold, said first stream comprising at least one lactam, alkali metal lactamate catalyst, at least one polyol and a tin catalyst, and said second stream comprising a lactam blocked adduct and a polyisocyanate.

38. A molded polymer alloy product obtained by:
(i) mixing substantially stable reactant streams to obtain a mixture,
(ii) introducing said mixture into a mold, said mixture comprising:
(a) polymer forming compounds for forming at least one polymer selected from the group consisting of polyurea polymers and polyisocyanurate polymers, said polyurea polymer forming compounds including a polyamine or hydrazine containing compound and a polyisocyanate, said polyisocyanurate polymer forming compounds including a prepolymer containing reactive isocyanate groups or a polyol and a polyisocyanate, and a trimerization catalyst; and
(b) polyamide polymer forming compounds, said polyamide polymer forming compounds including at least one lactam, an anionic polymerization catalyst and a polymerization activator,
said polymer forming compounds reacting in said mold wherein a molded product is formed from the respective polymer forming compounds; and
(iii) recovering said product from said mold.

39. The molded polymer alloy according to claim 38, wherein said mixture is substantially free of entrapped gases.

40. A polymer alloy comprising a polyamide polymer and at least one polymer selected from the group consisting of polyisocyanurates and polyureas, wherein
said polyamide polymer is polymerization product of 3 to 15 carbon ring lactams,
said polyisocyanurate polymer is the trimerization reaction product of an isocyanate-terminated urethane prepolymer of the reaction product of the trimerization of a polyol with an excess amount of an organic polyisocyanate in the presence of a urethane catalyst, and a trimerization catalyst, and
said polyurea polymer is the in-mold reaction product of an organic polyisocyanate and an amine-terminated poly(oxyalkylene) compound having an equivalent weight of about 1000 to 2000.

41. The polymer alloy according to claim 40 wherein said alloy is substantially free of entrapped gases.

42. The polymer alloy according to claim 40, wherein said polyamide polymer is the block copolymerization product of 3 to 11 carbon ring lactams.

43. A body part for a vehicle obtained according to claim 1.

44. A body part for a vehicle obtained according to claim 39.

45. The process according to claim 1 wherein in the process the temperature of the mold is between about 100° C. and 160° C.

46. The product according to claim 32, wherein said product is a reaction injection molded product consisting essentially of a polyamide polymer and a polyurea polymer.

* * * * *